US008116394B2

(12) United States Patent
Jia

(10) Patent No.: US 8,116,394 B2
(45) Date of Patent: Feb. 14, 2012

(54) LONG TERM EVOLUTION (LTE) RADIO LINK TIMING SYNCHRONIZATION

(75) Inventor: Yongkang Jia, Ottawa (CA)

(73) Assignee: Research In Motion Limited, Waterloo, Ontario (CA)

(*) Notice: Subject to any disclaimer, the term of this patent is extended or adjusted under 35 U.S.C. 154(b) by 793 days.

(21) Appl. No.: 12/209,272

(22) Filed: Sep. 12, 2008

(65) Prior Publication Data

US 2010/0067632 A1   Mar. 18, 2010

(51) Int. Cl.
*H04K 1/10* (2006.01)
*H04L 27/28* (2006.01)

(52) U.S. Cl. ........................................ 375/260
(58) Field of Classification Search .......... 375/231, 375/260, 261, 267, 332, 346, 347, 371; 455/7, 455/67.13, 447, 500, 562.1
See application file for complete search history.

(56) References Cited

U.S. PATENT DOCUMENTS

| 4,547,899 A | | 10/1985 | Nally |
| 5,495,256 A | * | 2/1996 | Piper .............................. 342/195 |
| 6,768,713 B1 | | 7/2004 | Siala et al. |
| 2008/0219343 A1 | | 9/2008 | Wu et al. |
| 2008/0219371 A1 | | 9/2008 | Hong et al. |
| 2008/0268857 A1 | * | 10/2008 | McCoy et al. ................ 455/447 |
| 2008/0298515 A1 | * | 12/2008 | Peyla et al. .................... 375/343 |
| 2009/0247229 A1 | * | 10/2009 | Teo et al. .................... 455/562.1 |

FOREIGN PATENT DOCUMENTS

| EP | 01871035 A1 | 12/2007 |
| WO | 2006083419 A2 | 8/2006 |

OTHER PUBLICATIONS

Oziewicz, M., "On Application of MUSIC Algorithm to Time Delay Estimation in OFDM Channels", IEEE Transactions on Broadcasting, vol. 51, No. 2, Jun. 1, 2005, p. 249-255.
Extended European Search Report from EP Application No. 08164304.1 mailed Aug. 20, 2009.
3GPP TSG RAN WG1 #49, "On maintenance of UL synchronization", by Nokia.
3GPP TSG RAN WG1 #49, "UL synchronization management and maintenance in E-UTRA", by Texas Instruments.
R. L. Frank and S. A. Zadoff, "Phase shift pulse codes with good periodic correlation properties", IRE Trans. on Information Theory (Correspondence), Oct. 1962.
David C. Chu, "Polyphase code with good periodic correlation properties", IEEE Trans. on Information Theory (Correspondence), Jul. 1972.
T. M. Schmidl, and D. C. Cox, "Robust frequency and timing synchronization for OFDM", IEEE Trans. on Communications, vol. 45, Dec. 1997.

(Continued)

*Primary Examiner* — David C. Payne
*Assistant Examiner* — Syed Haider

(57) ABSTRACT

A method for performing a radio link timing estimation for synchronization to a wireless communications channel such as an uplink channel in a 3GPP Long Term Evolution (LTE) network in a mobile wireless device or wireless network base station is provided. A channel frequency response estimate from a received reference signal comprising multiple non-coherent Orthogonal Frequency Division Multiplexing (OFDM) symbols is obtained. A frequency response covariance matrix from the channel frequency response estimate is then generated. Timing offsets of the received reference signal using covariance matrix and timing offset estimation algorithms are then estimated.

18 Claims, 30 Drawing Sheets

OTHER PUBLICATIONS

H. Minn, M. Zeng, and V. K. Bhargava, "On timing offset estimator for OFDM system", IEEE Communication Letters, vol. 4, Jul. 2000.

B. Park, H. Cheon, C. Kang, and D. Hong, "A novel timing estimation method for OFDM system", IEEE Communication letters, vol. 7, May 2003.

N. Chen, M. Tanaka, and R. Heaton, "OFDM timing synchronization under multi-path channels", IEEE Proc. on VTC 2003, Apr. 2003.

R. O. Schmidt, "Multiple emitter location and signal parameter estimation", IEEE Trans. on Antennas Propagation, vol. AP-34, Mar. 1986.

Roy and T. Kailath, "ESPRIT—Estimation of signal parameter via rational invariance techniques", IEEE Trans. on Acoustics, Speech and Signal Processing, vol. ASSP-37, Jul. 1989.

I. Ziskind and M. Wax, "Maximum likelihood location at multiple sources by alternating projection", IEEE Trans. on Acoustics, Speech and Signal Processing, vol. ASSP-36, Oct. 1988.

J. G. Proakis and D. G. Manolakis, "Digital Signal Processing", third edition, Section 12.5.5, published by Prentice Hall.

Chien-Chih Chen, Jung-Shan Lin—Interactive ML Estimation for frequency offset and time Synchronization in OFDM systems Sep. 27, 2004.

Osman T et al—An improved MUSIC algorith for estimation of time delays in asynchronous DE-CDMA systems—Aug. 6, 2002.

Extended European Search Report based on European Application No. 09812585.9 and dated Aug. 16, 2011.

Oziewicz, Marian; "On Application of MUSIC Algorithm to Time Delay Estimation in OFDM Channels", IEEE Transactions on Broadcasting, vol. 51, No. 2, Jun. 2005, pp. 249-255.

* cited by examiner

LONG TERM EVOLUTION (LTE) RADIO LINK TIMING SYNCHRONIZATION

TECHNICAL FIELD

The present disclosure relates to mobile wireless networks and in particular to radio link timing synchronization of long term evolution based wireless networks.

BACKGROUND

Timing and frequency synchronization is a crucial part of wireless communication such as Orthogonal Frequency Division Multiplexing (OFDM) technology based 3GPP Long Term Evolution (LTE) system. In fact, it is widely recognized that an OFDM based communication system is very sensitive to frequency and timing error and existing techniques do not meet the performance requirement for LTE uplink (UL) synchronization. The challenge for LTE UL timing synchronization is that, to keep the synchronization overhead as low as possible to preserve LTE system overall capacity, the radio resources are limited for timing estimation. That means only very narrow radio bandwidth, limited time duration and limited signal to noise ratio (SNR) for the reference signal are available, especially at cell edge. Accordingly, improved methods of radio link timing synchronization in LTE systems remain highly desirable.

BRIEF DESCRIPTION OF THE DRAWINGS

Further features and advantages will become apparent from the following detailed description, taken in combination with the appended drawings, in which.

It will be noted that throughout the appended drawings, like features are identified by like reference numerals.

DETAILED DESCRIPTION

Figure 1:
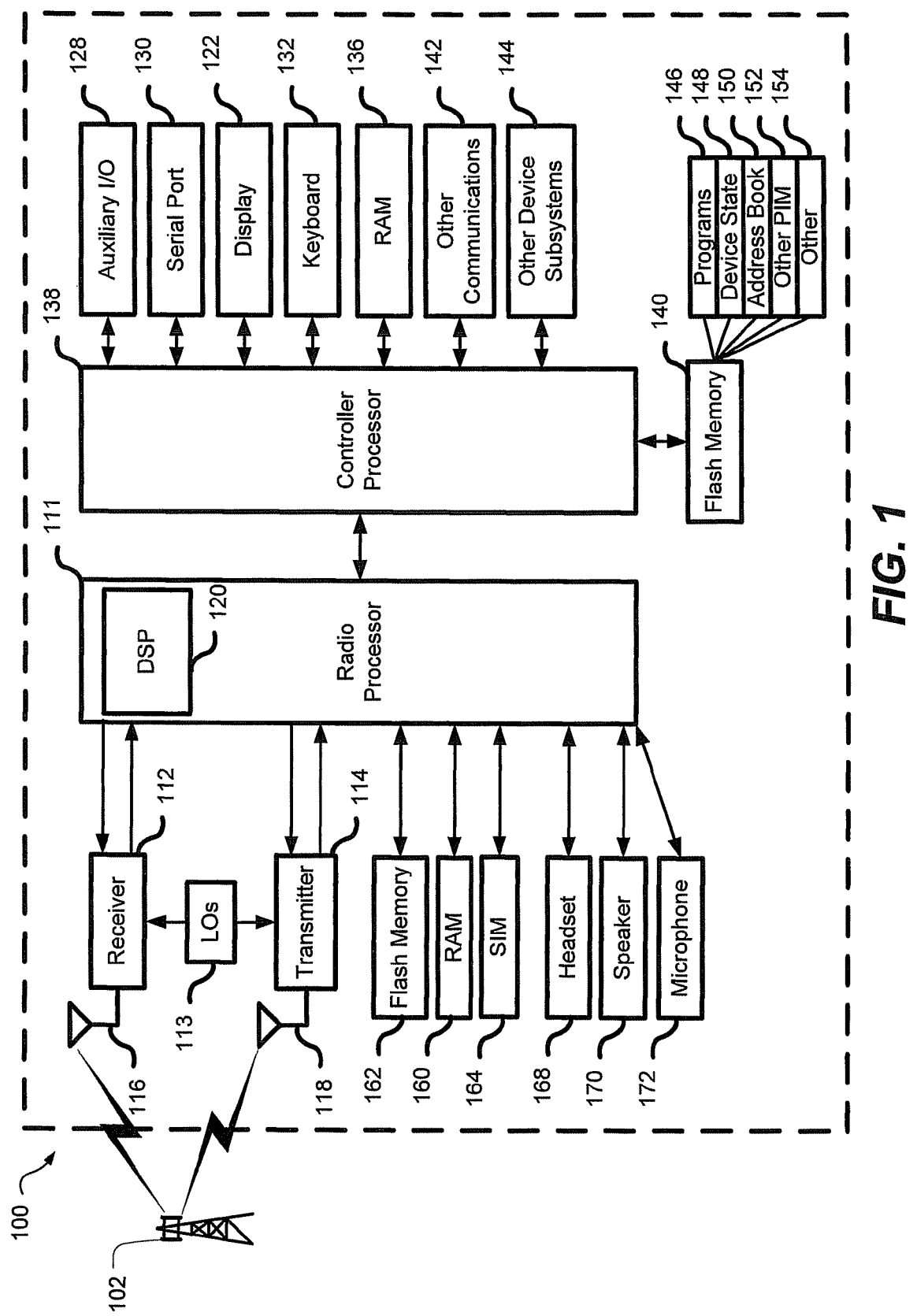
FIG. 1 is a block diagram of wireless mobile device.

In accordance with an embodiment of the present disclosure there is provided a method for performing a radio link timing estimation for synchronization to a wireless communications channel. The method comprises obtaining a channel frequency response estimate from a received reference signal comprising multiple non-coherent sounding reference signal (SRS) Orthogonal Frequency Division Multiplexing (OFDM) symbols, generating a frequency response covariance matrix from the channel frequency response estimate and estimating timing offsets of the received reference signal using covariance matrix and timing offset estimation algorithms.

In accordance with another embodiment the present disclosure there is provided a mobile wireless device operating on wireless network. The mobile wireless device comprises a receiver and a processor coupled to the receiver. The processor performs a radio link timing estimation for synchronization to a wireless communications channel. The timing estimation comprises obtaining a channel frequency response estimate from a received reference signal comprising multiple non-coherent sounding reference signal (SRS) Orthogonal Frequency Division Multiplexing (OFDM) symbols, generating a frequency response covariance matrix from the channel frequency response estimate and estimating timing offsets of the received reference signal using covariance matrix and timing offset estimation algorithms.

In accordance with another embodiment of the present disclosure there is provided a base station transceiver in a wireless network. The base station transceiver comprises a receiver and a processor coupled to the receiver. The processor performing a radio link timing estimation for synchronization to a wireless communications channel. The timing estimation comprises obtaining a channel frequency response estimate from a received reference signal comprising multiple non-coherent sounding reference signal (SRS) Orthogonal Frequency Division Multiplexing (OFDM) symbols, generating a frequency response covariance matrix from the channel frequency response estimate and estimating timing offsets of the received reference signal using covariance matrix and timing offset estimation algorithms.

In Orthogonal Frequency Division Multiplexing (OFDM) technology based 3GPP Long Term Evolution (LTE) system, two types of timing estimation techniques: time-domain based techniques and frequency-domain based techniques can be used in the receivers during synchronization. When there is little or no frequency error, a very straightforward and very efficient timing estimation technique is the correlation technique. With this technique, the receiver in the time domain correlates a known sequence with the received sounding reference signal (SRS) or demodulation reference signal (DRS) that has been modulated by a known sequence. The result of the correlation produces a peak that indicates signal arriving time offset. This timing estimation technique relies on the good circular correlation properties of the reference sequence. Ideally, the sequence should have zero circular autocorrelation when the time shift is not zero. When there is no time shift, the circular autocorrelation should produce a very high peak. Sequences generated with Zadoff-Chu codes have this property.

The correlation technique can directly be applied in a wireless multi-path environment. When the signal bandwidth is sufficiently wide, resolution of the different peaks (correspond to different paths) improves and this correlation technique can detect the time of arrival of the different paths by searching for the multiple correlation peaks. When a frequency offset (due to local oscillator drifting or Doppler shift) exists as well as the timing offset, the performance of this time domain correlation technique degrades to some degree.

This time-domain correlation timing estimation technique is based on a known sequence with good circular correlation property. Another type of time-domain timing estimation is based on exploring the periodic pattern of the reference signal. In general, when there is no significant frequency offset, the timing estimation techniques based on simple correlation with known reference sequence has better performance than these techniques based on exploring the periodic pattern of the reference signal.

For single-path radio propagation channels with ideal reflector, the channel impulse response would be a delta function with unknown time shift. This time shift is what the timing synchronization task needs to estimate and to correct later. In multi-path channel environment, the ideal channel impulse response would be multiple delta functions with different time shifts that correspond to the different paths' travel distances. The timing synchronization task should adjust the transmitter time to align the time of arrival of the first path with the receiver time.

FIG. 1 is a block diagram of a wireless mobile device 100 incorporating a communication subsystem having both a receiver 112 and a transmitter 114, as well as associated components such as one or more embedded or internal antenna elements 116 and 118, local oscillators (LOs) 113, and a processing module such as a digital signal processor (DSP) 120. The particular design of the communication subsystem will be dependent upon the communication network in which the device is intended to operate such as in a 3GPP LTE network.

The wireless mobile device 100 performs synchronization, registration or activation procedures by sending and receiving communication signals over the network 102. UL signals received by antenna 116 through communication network 100 are input to receiver 112, which may perform such common receiver functions as signal amplification, frequency down conversion, filtering, channel selection and the like, and in the example system shown in FIG. 1, analog to digital (A/D) conversion. A/D conversion of a received signal allows more complex communication functions such as demodulation, decoding and synchronization to be performed in the DSP 120.

In a similar manner, signals to be transmitted are processed, including modulation and encoding for example, by DSP 120 and input to transmitter 114 for digital to analog conversion, frequency up conversion, filtering, amplification and transmission over the communication network 102 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

Wireless device 100 preferably includes a radio processor 111 and a control processor 138 which together control the overall operation of the device. DSP 120 is located on radio processor 111. Communication functions are performed through radio processor 111.

Radio processor 111 interacts with receiver 112 and transmitter 114, and further with flash memory 162, random access memory (RAM) 160, the subscriber identity module 164, a headset 168, a speaker 170, and a microphone 172.

Microprocessor 138 interacts with further device subsystems such as the display 122, flash memory 140, random access memory (RAM) 136, auxiliary input/output (I/O) subsystems 128, serial port 130, keyboard 132, other communications 142 and other device subsystems generally designated as 144.

Some of the subsystems shown in FIG. 1 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list.

Software used by radio processor 111 and microprocessor 138 is preferably stored in a persistent store such as flash memory 140 and 162, which may instead be a read-only memory (ROM) or similar storage element (not shown). Those skilled in the art will appreciate that the operating system, specific device applications, or parts thereof, may be temporarily loaded into a volatile memory such as RAM 136 and RAM 260. Received communication signals may also be stored in RAM 136.

As shown, flash memory 140 can be segregated into different areas for computer programs 146, device state 148, address book 150, other personal information management (PIM) 152 and other functionality generally designated as 154. These different storage types indicate that each program can allocate a portion of flash memory 140 for their own data storage requirements. Control processor 138, in addition to its operating system functions, preferably enables execution of software applications on the mobile station.

For voice communications, overall operation of wireless mobile device 100 is similar, except that received signals would preferably be output to the speaker 170 or headset 168 and signals for transmission would be generated by the microphone 172. Alternative voice or audio I/O subsystems, such as a voice message recording subsystem, may also be implemented on mobile station 102.

Serial port 130 in FIG. 1 would normally be implemented in a wireless mobile device that have PDA functionality for which synchronization with a user's desktop computer (not shown) may be desirable, but is an optional device component. Such a port 130 would enable a user to set preferences through an external device or software application and would extend the capabilities of wireless mobile device 100 by providing for information or software downloads to wireless mobile device 100 other than through a wireless communication network. The alternate download path may for example be used to load an encryption key onto the device through a direct and thus reliable and trusted connection to thereby enable secure device communication.

Other device subsystems 144, such as a short-range communications subsystem, is a further optional component which may provide for communication between wireless mobile device 100 and different systems or devices, which need not necessarily be similar devices. For example, the subsystem 144 may include an infrared device and associated circuits and components or a Bluetooth™ communication module to provide for communication with similarly enabled systems and devices.

Figure 2:
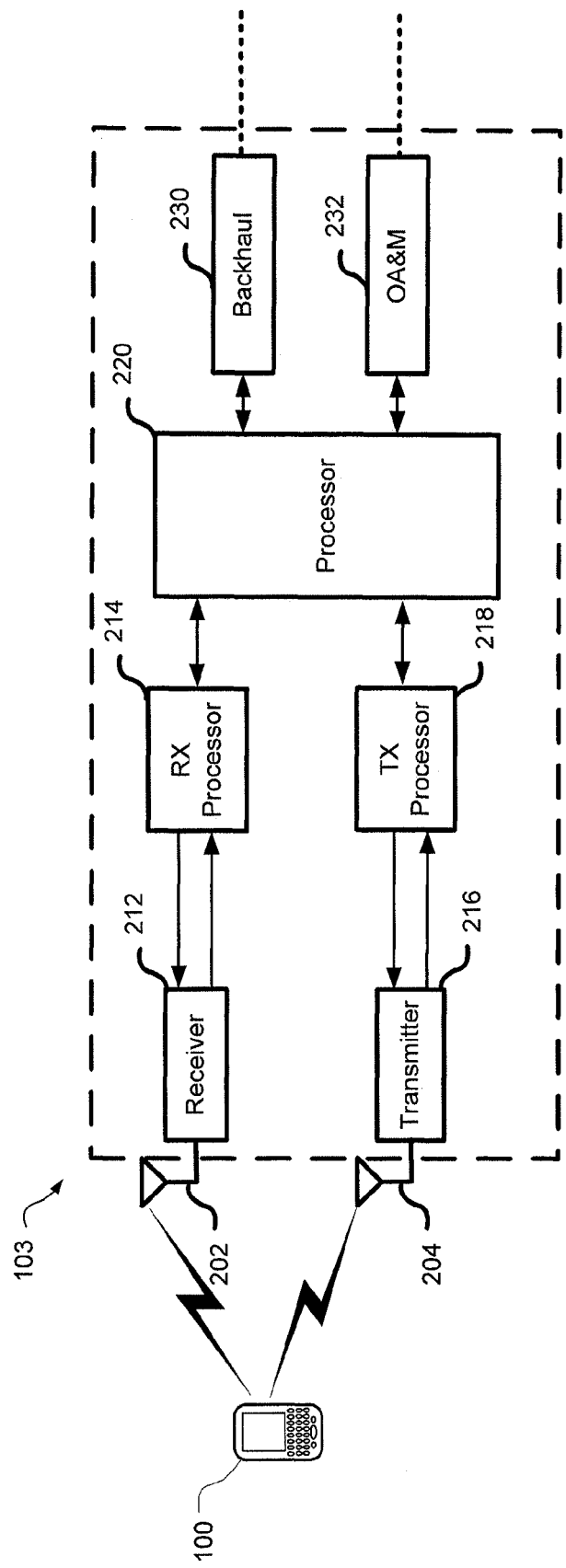
FIG. 2 is a block diagram of a wireless base station.

FIG. 2 is a block diagram of wireless base station 103 connected to wireless network 102. The wireless base station 103 communicates with a plurality of wireless mobile devices located in the service region. A receiver 212 is coupled to one or more receive antennas 202 for processing signals from the wireless mobile devices. Downlink (DL) signals from wireless mobile devices are received by antenna 202 are input to receiver 212, which may perform common receiver functions as signal amplification, frequency down conversion, filtering, channel selection and analog to digital (A/D) conversion. A/D conversion of a received signal allows more complex communication functions such as demodulation, decoding and synchronization to be performed in the receive processor 214. In the transmission path, one or more transmit antennas 204 are coupled to a transmitter 216. The transmitter 216 provides frequency up-conversion including modulation, amplification and transmission over the communication to wireless mobile device 100. Digital to analog conversion and encoding can be performed by transmit processor 218. The processor 220 provides additional processing of the received and transmitted signals and interfaces with backhaul interfaces 230 and OA&M 232 interfaces with the rest of the wireless network 102 for operation of the BTS 103. The receive processor 214 may additional perform timing synchronization on signals received from wireless mobile devices 100 on the wireless network 102.

Figure 3:
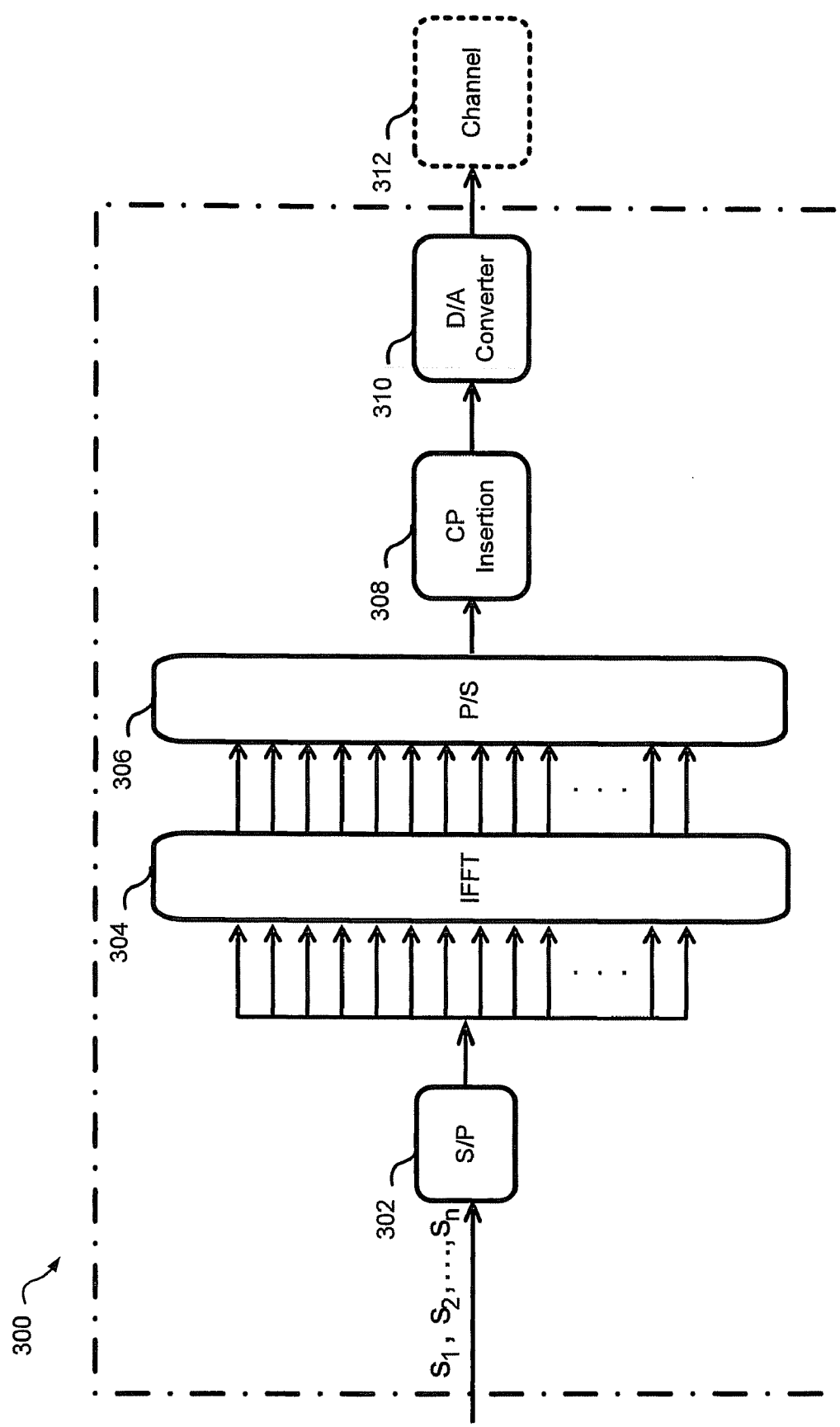
FIG. 3 is a schematic representation of a simplified OFDM transmitter.

In OFDM systems, it is much easer to estimate the channel frequency response than to estimate channel impulse response directly. Under the assumption that the transmitter and receiver are roughly synchronized, the receiver can correctly sample the wireless mobile device's UL SRS OFDM symbol without inter symbol interference (ISI). FIG. 3 shows a simplified OFDM transmitter 300 as would be implemented in transmitter 114 and DSP 120 in the wireless mobile device 100 and transmitter 216 and transmit processor 218 in the BTS 103. The input is a sequence of reference symbols which is provided to serial to parallel converter 302. The parallel symbol stream is processed by an inverse-Fourier transform (IFFT) 304 and converted by a parallel to serial converter 306. A cyclic prefix can then be inserted at 308 prior to digital to analog converter 310. The signal can the be amplified and modulated before transmission via channel 312.

Figure 4:
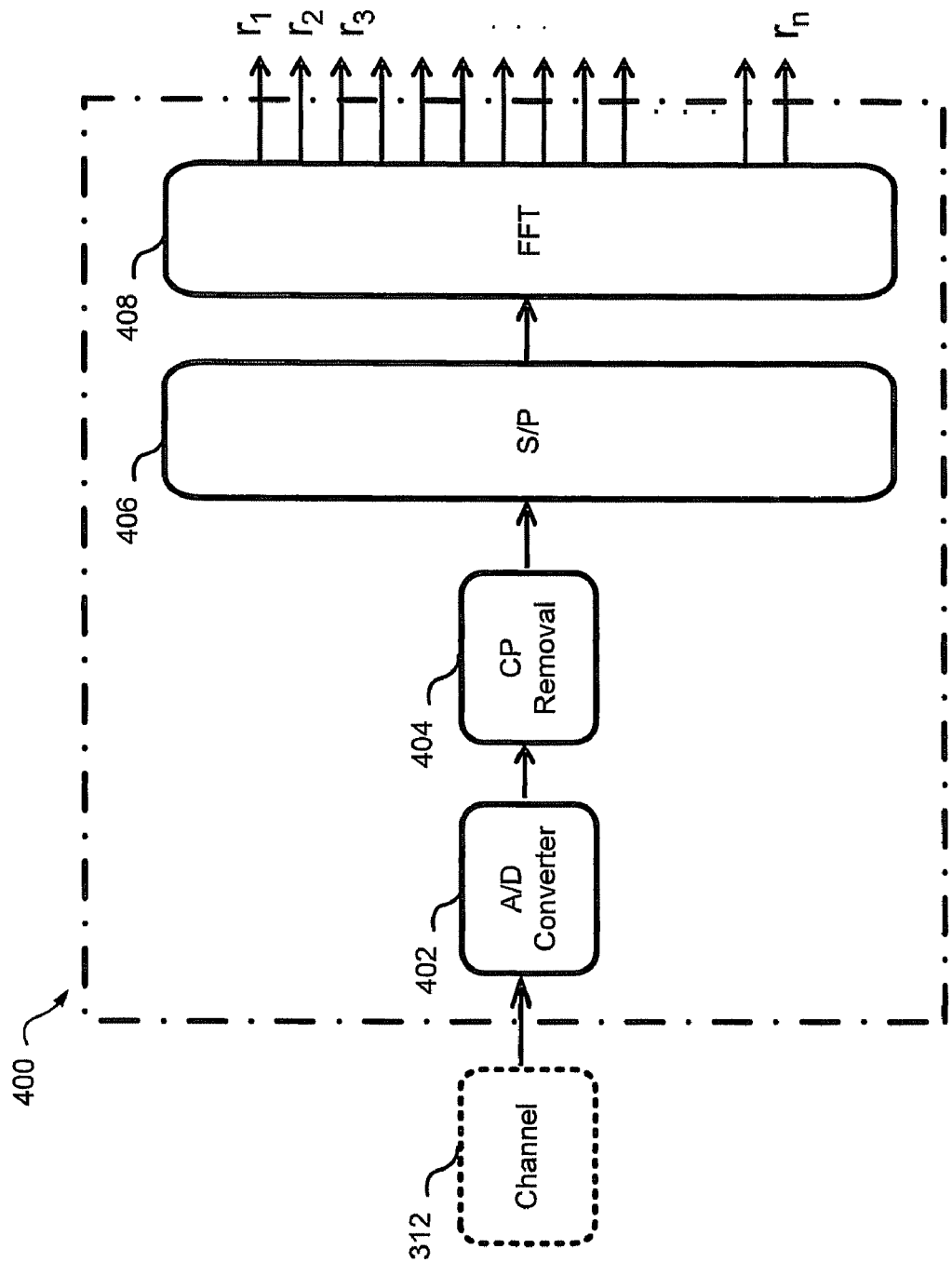
FIG. 4 is a schematic representation of a simplified OFDM receiver.

FIG. 4 shows a simplified receiver 400. Upon receiving the signal through channel 312, the signal is down-converted and demodulated. The analog to digital converter 402 then provides a digital stream for cyclic prefix removal 404. The data stream is then converted from a serial to parallel stream at 406. Taking an FFT 408 of this time-domain sampled sequence to transform it into the frequency domain, the channel frequency response can be derived by dividing the received frequency-domain sequence by the reference sequence that is modulated on the sub-carriers. The simplest way to get the channel impulse response is to do an IDFT on the frequency response, either use a windowed IDFT or a non-windowed IDFT.

Figure 5:
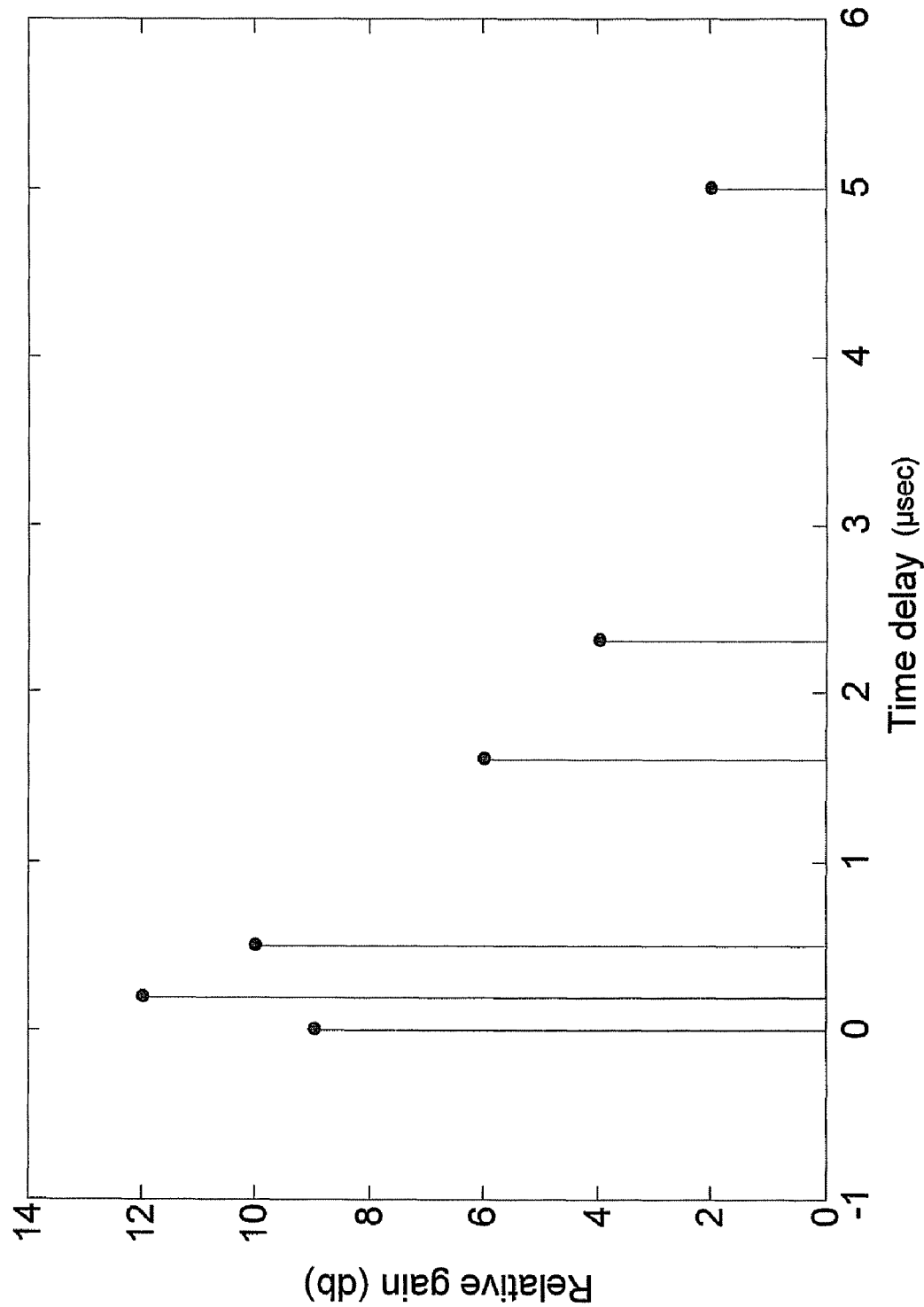
FIG. 5 is graph of a typical urban channel delay profile.

FIG. 5 illustrates a typical urban radio channel (TU 30) delay profile which has been used for GSM system performance evaluation providing similar characteristics to an LTE system as would be defined by channel 312. Table 1 shows the similarity of the channel impulse response estimation, signal spectrum estimation and the direction of arrival (DOA) estimation in array signal processing. Note that equally-spaced sampling on the observing domains is assumed for comparison purposes in the following table.

In the table above, $\Delta f$ denotes the frequency spacing between each sample in frequency domain; $\Delta T$ denotes the time spacing between each sample in time domain; and l, $\lambda$ and $\theta$ denote the distance between each sensor of the array, carrier wavelength and signal arrival angle respectively.

From the comparison in table 1, it can be seen that the timing estimation, spectrum estimation and DOA estimation are all same from a mathematical point of view. They differ only in that they have a different constant factor in the transformation vector. That means all the algorithms for spectrum estimation and DOA estimation can be used for timing estimation, if the frequency domain observations can be easily obtained.

In an OFDM system like LTE, the channel frequency response can be easily obtained when the timing is roughly synchronized between the transmitter and the receiver. The UL frequency can also be assumed to be synchronized. The radio propagation channel is generally modeled as multi-path channel. This channel model is similar with multiple, different frequency sinusoid wave signal model in spectrum estimation. It is also similar with the signal model in array signal processing that has multiple signals arrive from different directions. This similarity opens an opportunity to apply the DOA estimation algorithms and spectrum estimation algorithms to timing estimation, for example, linear Fourier Analyzing (FA) algorithm, sub-space decomposition based Multiple Signal Classification (MUSIC) algorithm, or sub-space fitting based Maximum Likelihood (ML) algorithm.

Current LTE UL timing estimation algorithms use just one OFDM symbol to estimate the signal timing offset; therefore, relatively high signal to noise ratio (SNR) is required for these algorithms to be effective. At the cell edge, the SNR is normally very low and these algorithms may not meet the LTE system performance requirement.

It is assumed that the wireless mobile device uplink is already roughly synchronized. That means the wireless mobile device UL timing offset is within a certain range. In this range, with the cyclic prefix (CP) in place, the enhanced Node B (eNB) can correctly sample the SRS OFDM symbol's baseband signal in time domain without any ISI, but the timing offset information is contained in the samples. It is also

TABLE 1

Similarity of timing, spectrum and DOA estimation

| | Timing estimation | Spectrum estimation | DOA estimation |
|---|---|---|---|
| Observation domain | Frequency domain | Time domain | Space domain |
| Samples of one observation $\bar{x} =$ | Samples on different frequency (sub-carrier) $[x_1^f, x_2^f, \ldots, x_{N-1}^f]^T$ | Samples on different time $[x_1^t, x_2^t, \ldots, x_{N-1}^t]^T$ | Samples on different sensor of the array $[x_1^s, x_2^s, \ldots, x_{N-1}^s]^T$ |
| Target domain | Time domain | Frequency domain | DOA angle domain ($\cos(\theta)$ domain) |
| Domain transformation vector $\bar{a}$ | $\bar{a}(t) = \begin{bmatrix} 1 \\ e^{j2\pi\Delta ft} \\ \vdots \\ e^{j2\pi\Delta f(N-1)t} \end{bmatrix}$ | $\bar{a}(f) = \begin{bmatrix} 1 \\ e^{-j2\pi\Delta Tf} \\ \vdots \\ e^{-j2\pi\Delta T(N-1)f} \end{bmatrix}$ | $\bar{a}(\theta) = \begin{bmatrix} 1 \\ e^{-j2\pi l \cos(\theta)/\lambda} \\ \vdots \\ e^{-j2\pi l(N-1)\cos(\theta)/\lambda} \end{bmatrix}$ |
| Domain transformation | IDFT $\bar{a}(t)^T \cdot \bar{x}$ | DFT $\bar{a}(f)^T \cdot \bar{x}$ | DFT-like transformation $\bar{a}(\theta)^T \cdot \bar{x}$ | assumed that the wireless mobile device's frequency error is small and can be ignored. (Frequency offset estimation and correction will not be discussed in this disclosure). After the FFT operation on these time domain samples, a frequency domain sample of the SRS OFDM symbol can be obtained. Note $$\bar{r}_k = [r_1^{(k)}, r_2^{(k)}, \ldots, r_N^{(k)}]^T \quad (1)$$

as the sampled vector of the k-th SRS OFDM symbol in frequency domain at the sub-carriers that the wireless mobile device is assigned to transmit the SRS. Where, N is number of total sub-carriers the SRS is transmitted on, and K is the total number of SRS OFDM symbols sampled. Let $$\bar{c} = [c_1, c_2, \ldots, c_N]^T \quad (2)$$

denote the indexes of the sub-carriers assigned to the wireless mobile device. The SRS reference sequence (the input in FIG. 3) is noted as:

$$\bar{s} = [s_1, s_2, \ldots, s_N]^T \quad (3)$$

Generally, a constant amplitude complex sequence $s_1, s_2, \ldots, s_N$ is used in LTE.

Assume that there are M multi-paths in the radio propagation channel with different time delays $t_m$ and complex attenuation factor $h_m^{(k)}$, and $m=1, 2, \ldots, M$ at the instance of the k-th SRS symbol. It is assumed that the multi-paths complex attenuation factors are stochastic processes and are not coherent with each other. Within one timing estimation period, it is assumed the time offset $t_1, t_2, \ldots, t_M$ for the M multi-paths are constants. Denote the following vectors:

$$\bar{h}_k = [h_1^{(k)}, h_2^{(k)}, \ldots, h_M^{(k)}]^T \quad (4)$$

$$\bar{a}_{t_m} = [e^{j2\pi\Delta f c_1 t_m}, e^{j2\pi\Delta f c_2 t_m}, \ldots, e^{j2\pi\Delta f c_N t_m}]^T \quad (5)$$

$$\bar{A} = [\bar{a}_{t_1}, \bar{a}_{t_2}, \ldots, \bar{a}_{t_M}] \quad (6)$$

Where $\Delta f$ is the sub-carrier spacing in the OFDM system. It is further assumed that the signal is a narrow bandwidth signal. With the above assumptions and notations, the frequency domain sample of the received baseband signal for the k-th SRS OFDM symbol can be expressed as:

$$\bar{r}_k = \bar{s} \circ \bar{A} \cdot \bar{h}_k + \bar{n}_k \quad (7)$$

In the equation above, the "$\circ$" denotes the Hadamard product (matrix element product) operator, and $\bar{n}_k$ denotes the additive noise in the frequency domain. We assume that the sampled noise in time domain is additive white Gaussian noise. It is obvious that the frequency domain noise $\bar{n}_k$ is still additive white Gaussian noise with independent identical distribution (i.i.d.).

The estimate of the channel frequency response based on the k-th SRS OFDM symbol is denoted as:

$$\bar{x}_k = [x_1^{(k)}, x_2^{(k)}, \ldots, x_N^{(k)}]^T \quad (8)$$

From the discussion above, the channel frequency response can be estimated as:

$$\bar{x}_k = \bar{r} \cdot / \bar{s} = \bar{A} \cdot \bar{h}_k + \bar{n}_k \cdot / \bar{s} \quad (9)$$

Where "·/" denotes the matrix element dividing operator. With the assumption that the SRS reference sequence in frequency domain has constant amplitude across the sub-carriers, it is easy to see that $\bar{n}_k \cdot /\bar{s}$ is still white Gaussian noise with independent identical distribution. We still make the following note for simplicity:

$$\bar{x}_k = \bar{A} \cdot \bar{h}_k + \bar{n}_k \quad (10)$$

The above equation is the system signal model. In the equation, the vector $\bar{x}_k$ can be simply obtained from the frequency domain observed vector $\bar{r}_k$. Unknown time offset parameters $t_1, t_2, \ldots, t_M$ within the matrix $\bar{A}$ are the parameters that need to be estimated. The unknown channel complex parameters $\bar{h}_k$ are not of interest for the LTE UL timing synchronization.

A large number of algorithms for spectrum estimation and array signal DOA estimation can be applied in LTE UL timing estimation. Three well-known DOA estimation algorithms, linear Fourier Analyzing algorithm, sub-space decomposition based MUSIC algorithm and sub-space fitting based Maximum Likelihood (ML) algorithm, are presented for the LTE UL timing estimation without mathematic derivation.

It should be pointed out that the current timing offset estimation algorithms are based on single OFDM symbol samples. In the present disclosure samples of multiple non-coherent OFDM symbols are used to combat low SNR at the cell edge of LTE system.

First, the covariance matrix of the channel frequency response is estimated as:

$$\bar{X} = \frac{1}{K} \sum_{k=1}^{K} \bar{x}_k \cdot \bar{x}_k^H \quad (11)$$

The $(\cdot)^H$ in above equation denotes Hermitian operation. The covariance matrix collects the information from all samples. Be aware that the covariance operation does not increase the SNR. It is not a coherent accumulation. The benefit of the covariance matrix is that it decreases the variance of the estimated noise power and signal power with increasing numbers of samples, but does not decrease the average noise power or increase the signal power.

If the frequency response is sampled with equal spacing in frequency domain, the exact covariance matrix (mathematically expectation) should not only be a Hermitian matrix (conjugate symmetric matrix), but also should a Teoplitz matrix, in which the value of the elements along each descending diagonal is a constant. With a limited number of symbols (small value of K), the estimated covariance matrix X will lose the properties of Hermitian and Teoplitz matrix in some degree. To improve the covariance matrix estimate accuracy, the value of the matrix elements along each descending diagonal can be replaced with their average value. Mathematically, the averaged covariance matrix can be expressed as:

$$\hat{\bar{X}} = \begin{bmatrix} \hat{x}_0 & \hat{x}_1 & \hat{x}_2 & \ldots & \hat{x}_{N-1} \\ \hat{x}_1^* & \hat{x}_0 & \hat{x}_1 & \ldots & \hat{x}_{N-2} \\ \hat{x}_2^* & \hat{x}_1^* & \hat{x}_0 & \ldots & \hat{x}_{N-3} \\ \vdots & \vdots & \vdots & \ddots & \vdots \\ \hat{x}_{N-1}^* & \hat{x}_{N-2}^* & \hat{x}_{N-3}^* & \ldots & \hat{x}_0 \end{bmatrix}, \quad (12)$$

where the elements $\hat{x}_i$ of the averaged matrix $\hat{\bar{X}}$ is calculated from the elements $x_{l,m}$ of the matrix $\bar{X}$ as:

$$\hat{x}_i = \text{average}\{x_{l,m}, x^*_{m,l}, \text{ for all } (l-m)=i\} \quad (13)$$

Notation (5) is rewritten as:

$$\bar{a}(t) = [e^{j2\pi\Delta f c_1 t}, e^{j2\pi\Delta f c_2 t}, \ldots, e^{j2\pi\Delta f c_N t}]^T \quad (14)$$

The linear Fourier Analyzing (FA) algorithm is given as searching for the position in time axis where the following metric reaches its peaks:

$$m_{BF}(t) = \bar{a}(t)^H \cdot \bar{X} \cdot \bar{a}(t) \quad (15)$$

The sub-space decomposition based MUSIC algorithm's searching metric is given by:

$$m_{MUSIC}(t) = \frac{1}{\|\bar{a}(t)^H \cdot \bar{E}_N\|^2} \quad (16)$$

Where, in above equation, $\bar{E}_N$ denotes the noise sub-space matrix of the covariance matrix $\bar{X}$. $\bar{E}_N$ is composed of (N–M) eigenvectors corresponding to the (N–M) smallest eigenvalues of the matrix $\bar{X}$ and can be expressed as: $\bar{E}_N = [\bar{e}_1, \bar{e}_2, \ldots, \bar{e}_{N-M}]$, where $\|\cdot\|$ denotes vector norm operation.

The subspace-fitting based Maximum Likelihood (ML) algorithm has more computational complexity, it involves a joint multiple dimension optimization. The ML algorithm can be formulated as:

$$m_{ML}(t_1, t_2, \ldots, t_M) = \sum_{k=1}^{K} \bar{x}_k^H \cdot \bar{P}_A(t_1, t_2, \ldots, t_M) \cdot \bar{x}_k \quad (17)$$

$$[t_1, t_2, \ldots, t_M] \arg\max_{t_1, t_2, \ldots, t_M} m_{ML}(t_1, t_2, \ldots, t_M) \quad (18)$$

Where, $\bar{P}_A(t_1, t_2, \ldots, t_M) = \bar{A} \cdot (\bar{A}^H \cdot \bar{A})^{-1} \cdot \bar{A}^H$ is a projection matrix of $\bar{A}$ and it is a function of the multiple time offset of the propagation paths.

It is well known that the ML performs better than the FA and MUSIC timing offset estimation algorithms, especially with a limited number of samples and limited SNR. However, the additional computational complexity is very costly to implement with present hardware technology.

Figure 6:
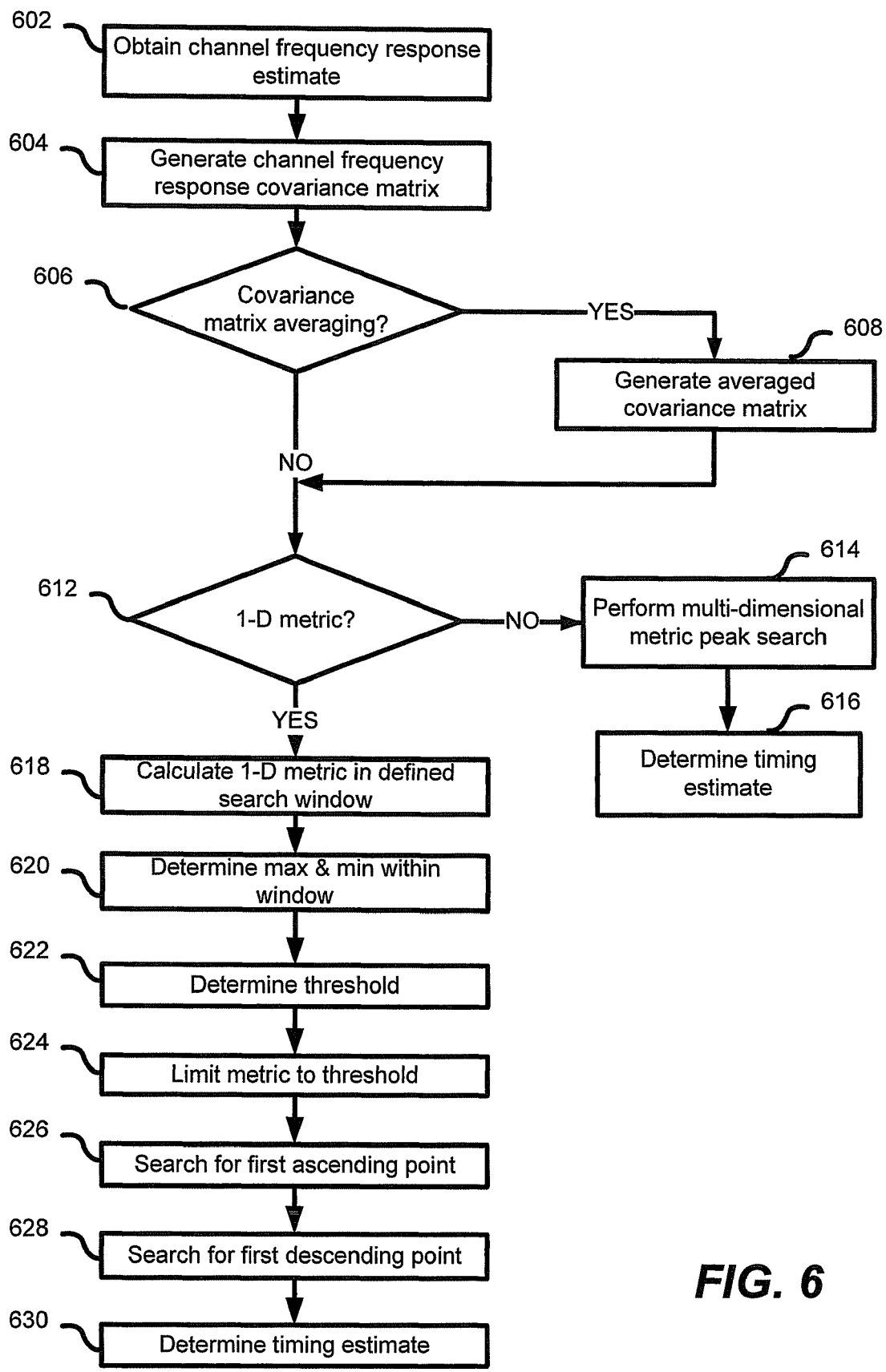
FIG. 6 is a method of performing timing synchronization.
Figure 7A:
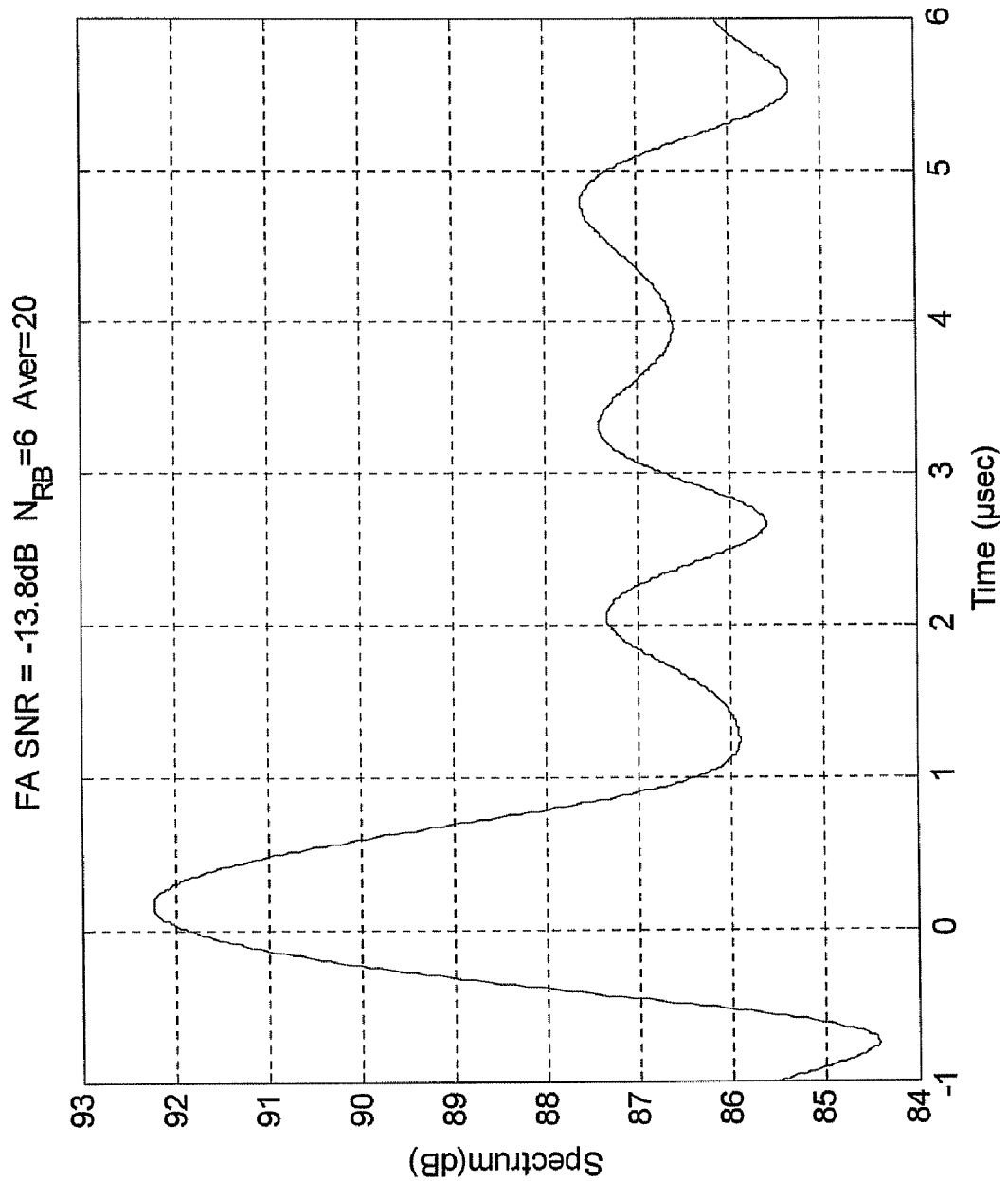
FIGS. 7A-D are estimated time delay profiles for simulation Case 1.
Figure 7B:
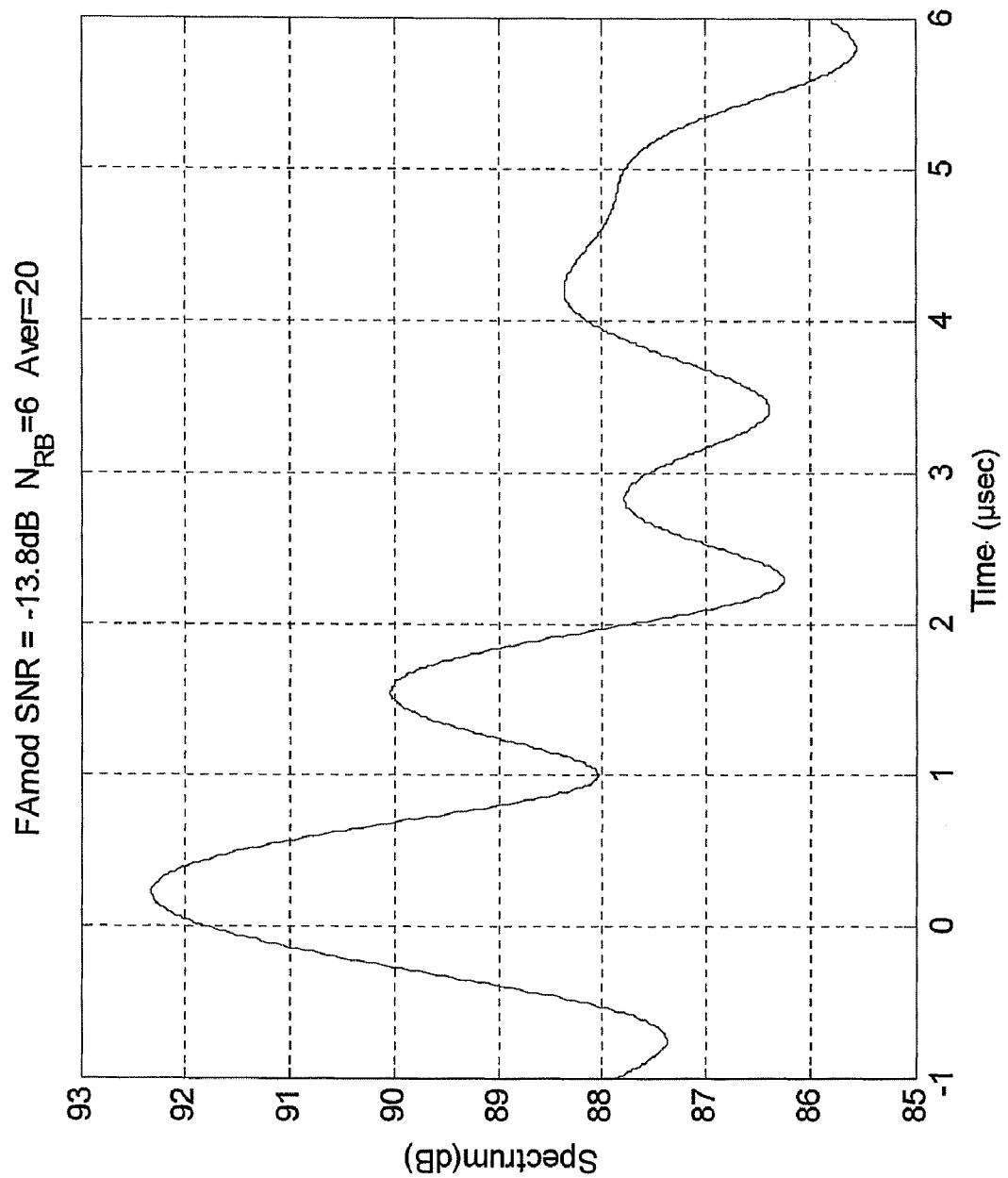
Figure 7C:
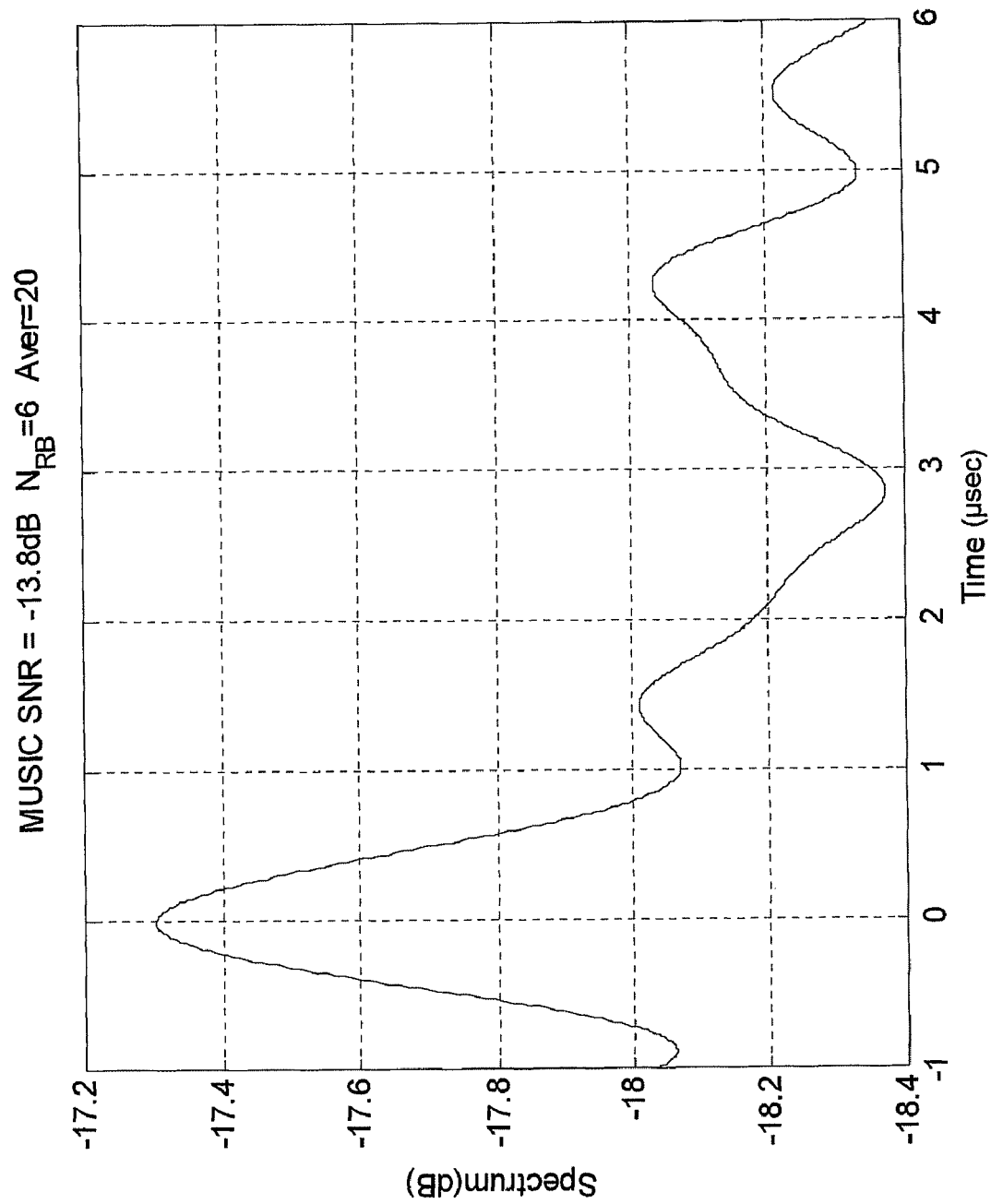
Figure 7D:
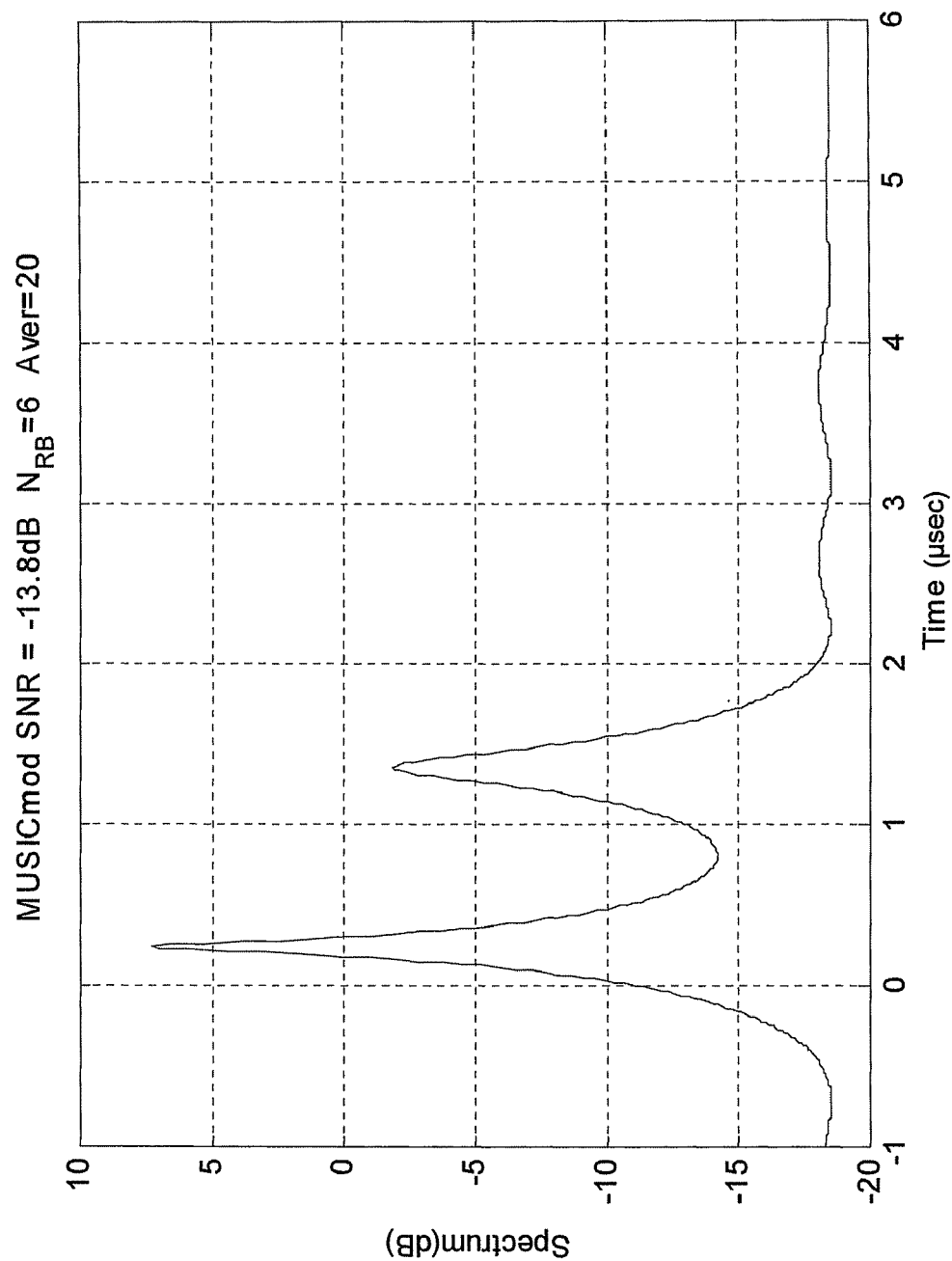
Figure 8A:
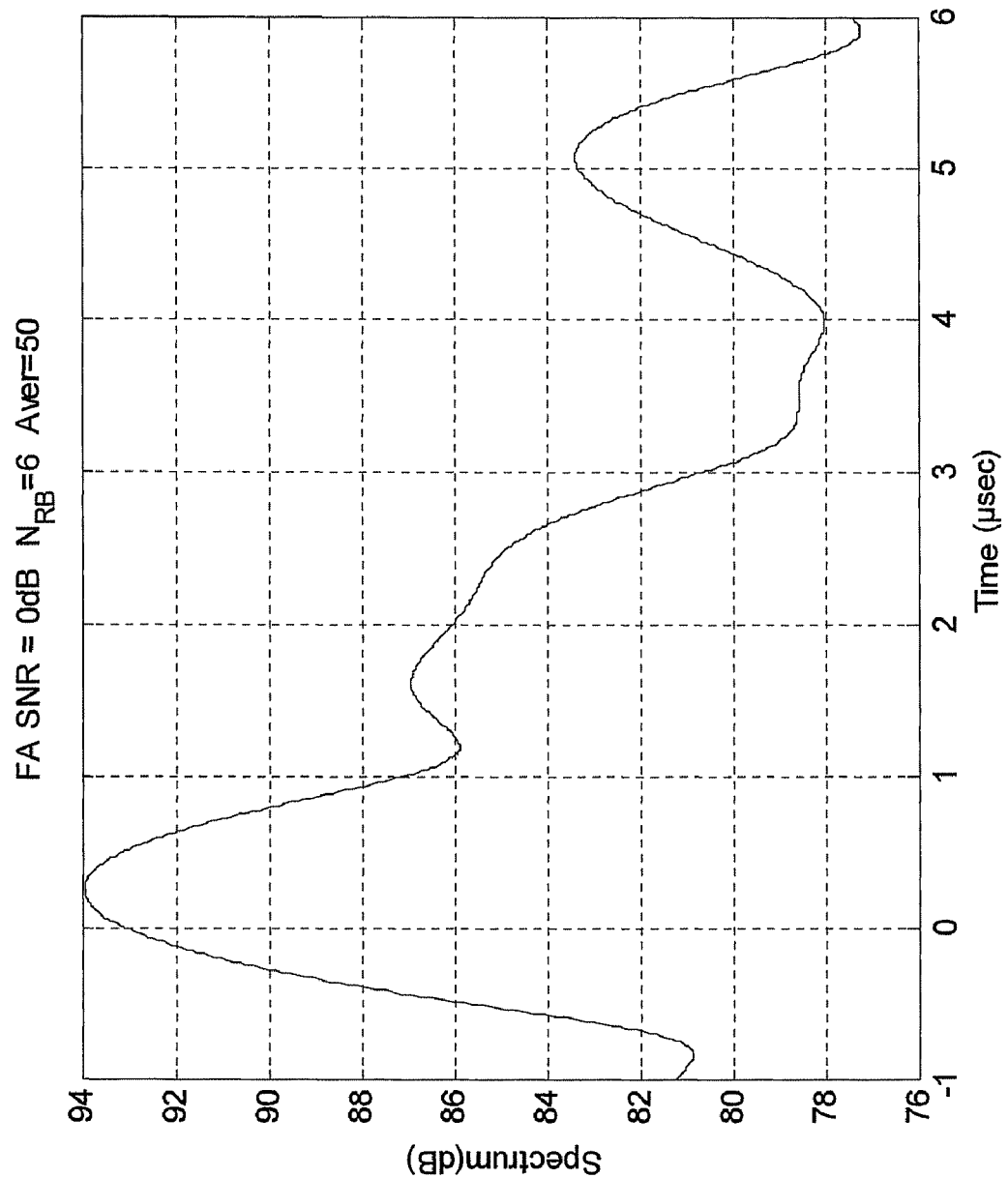
FIGS. 8A-D are estimated time delay profiles for simulation Case 2.
Figure 8B:
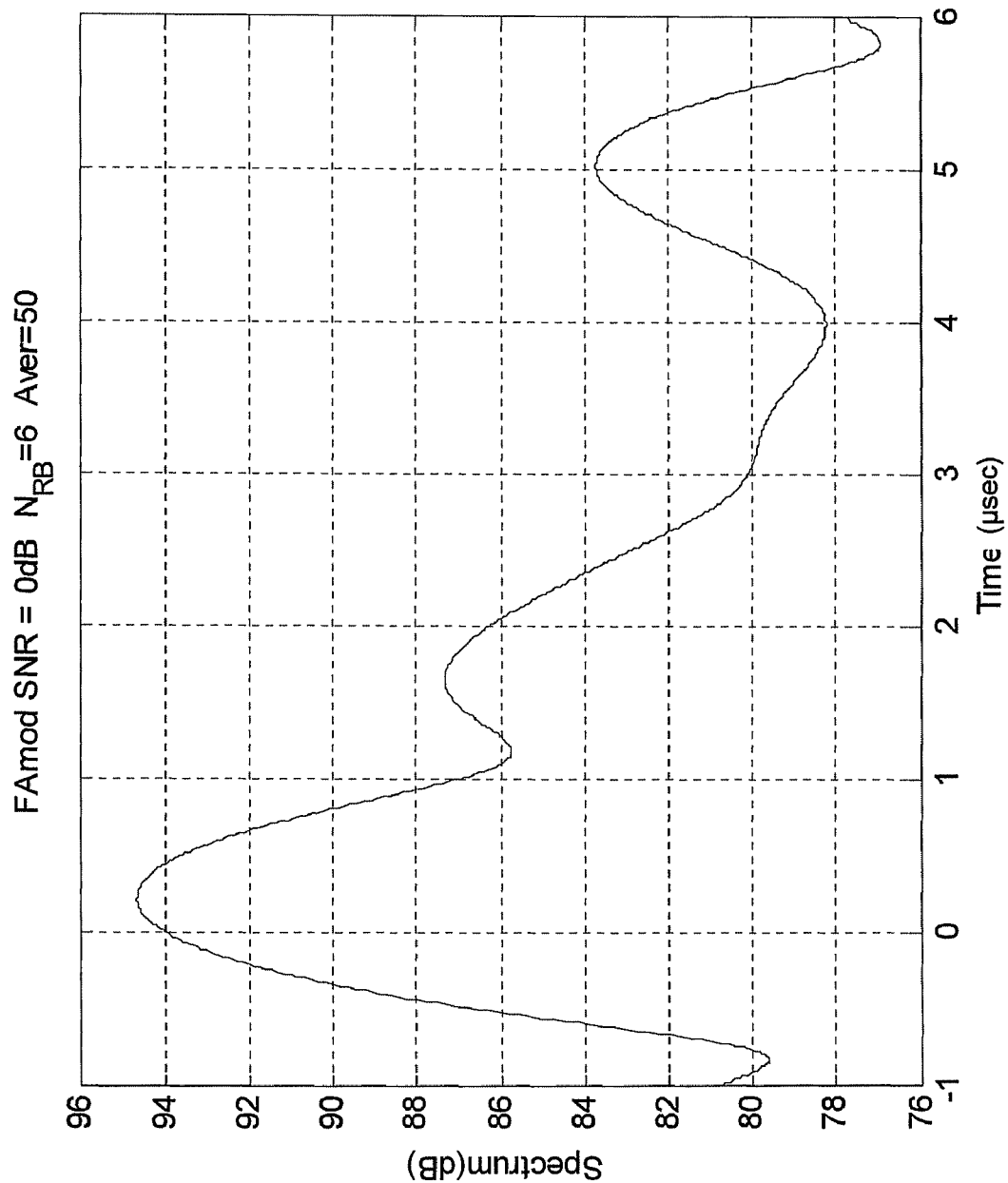
Figure 8C:
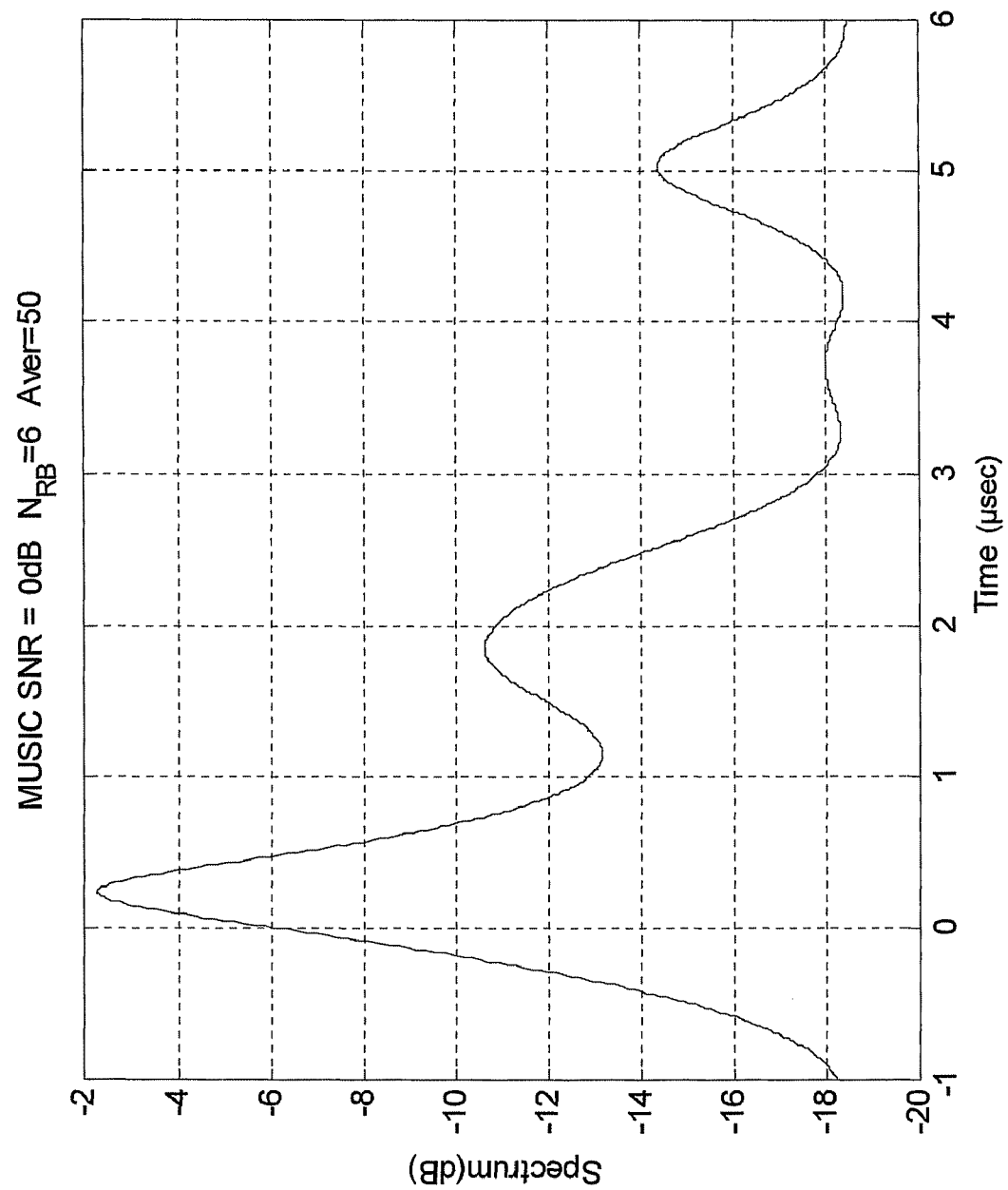
Figure 8D:
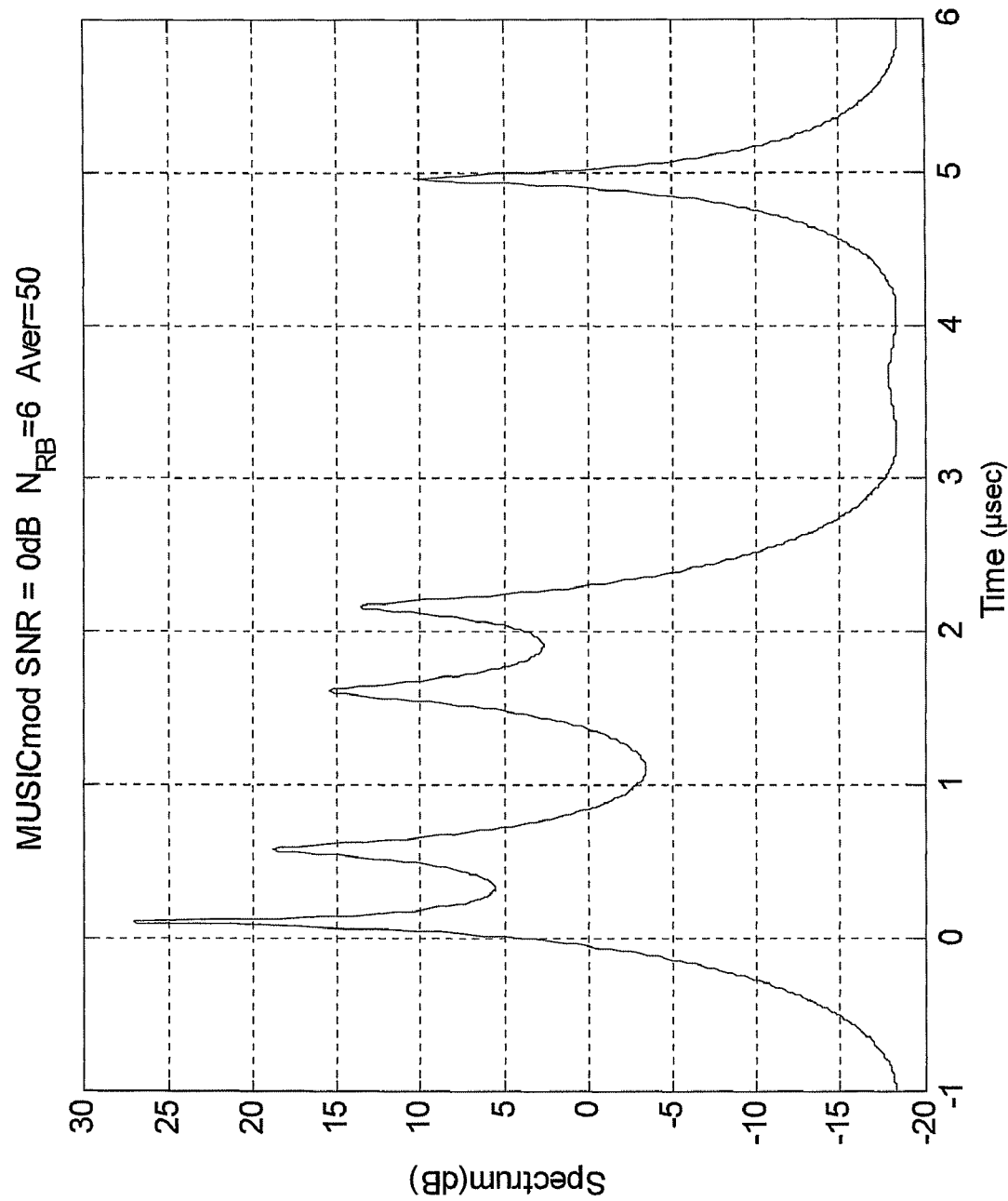
Figure 9A:
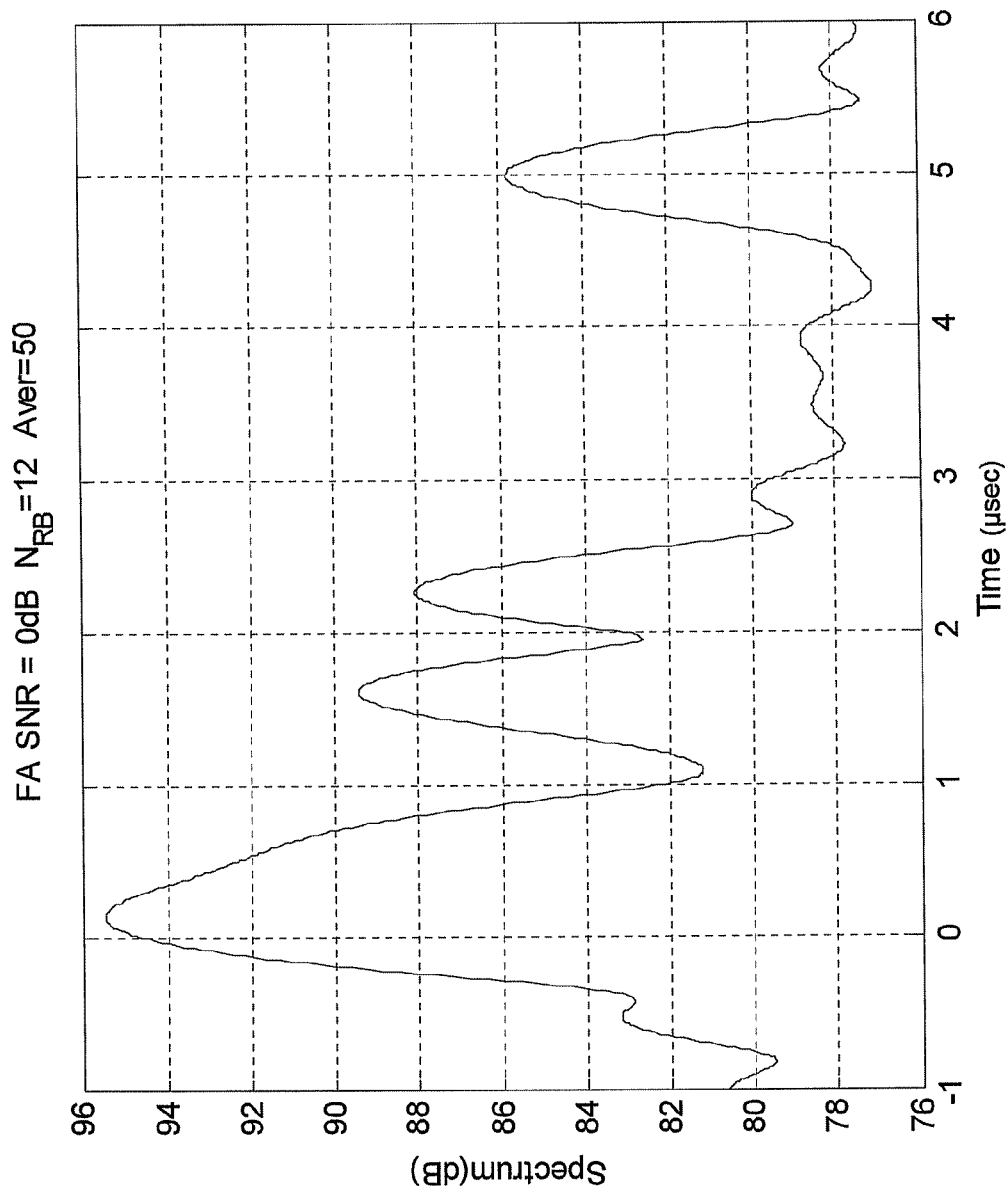
FIGS. 9A-D are estimated time delay profiles for simulation Case 3.
Figure 9B:
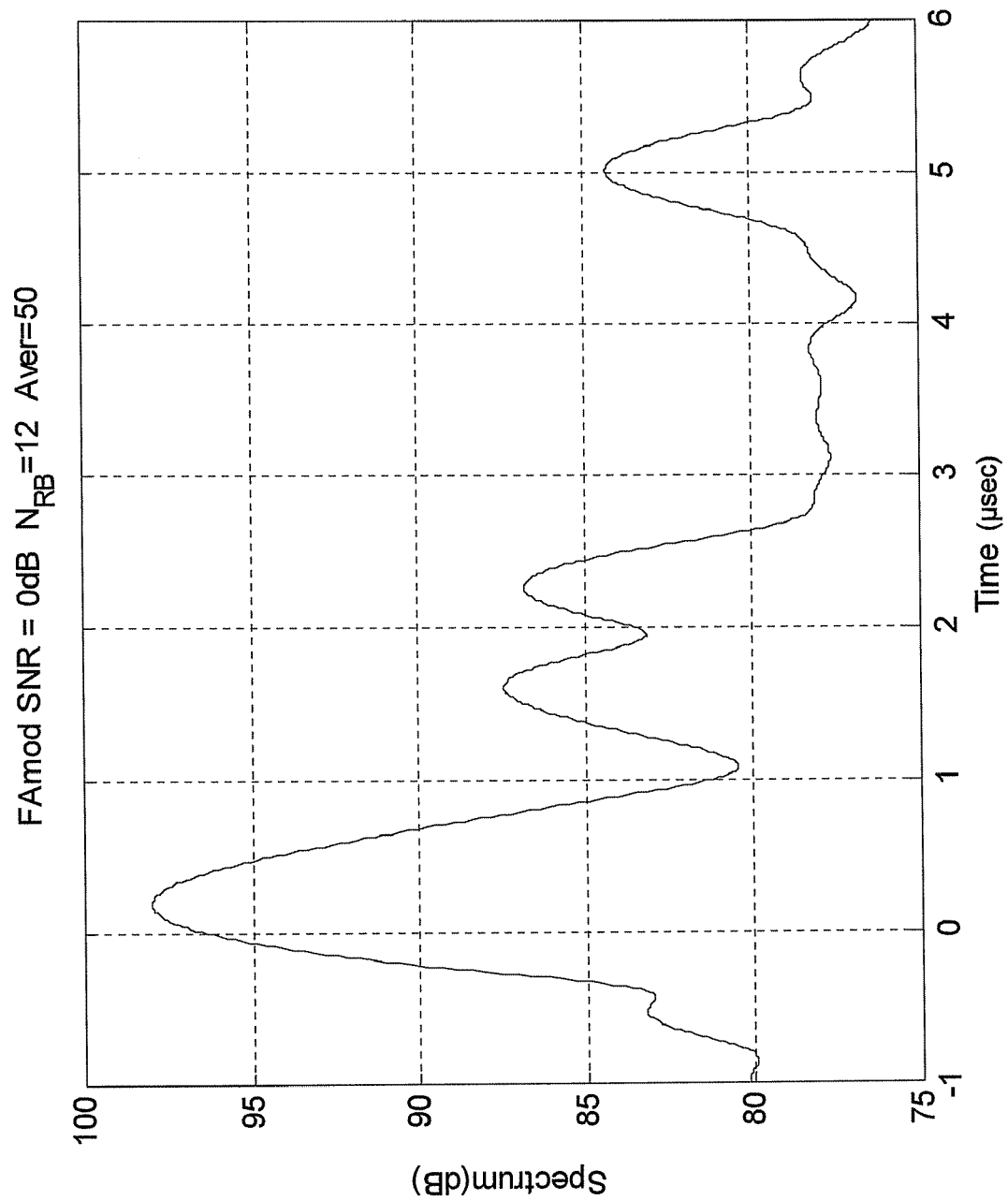
Figure 9C:
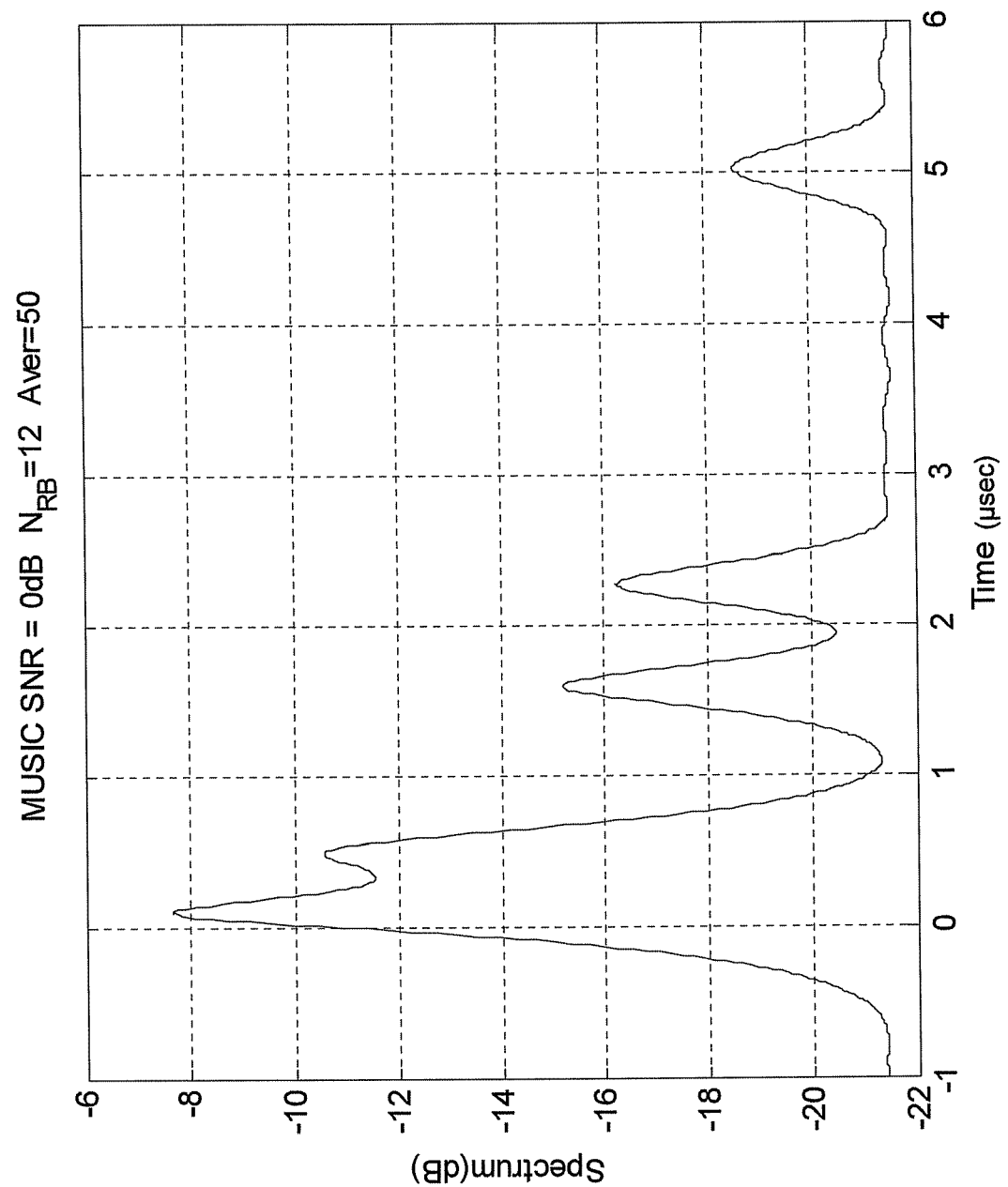
Figure 9D:
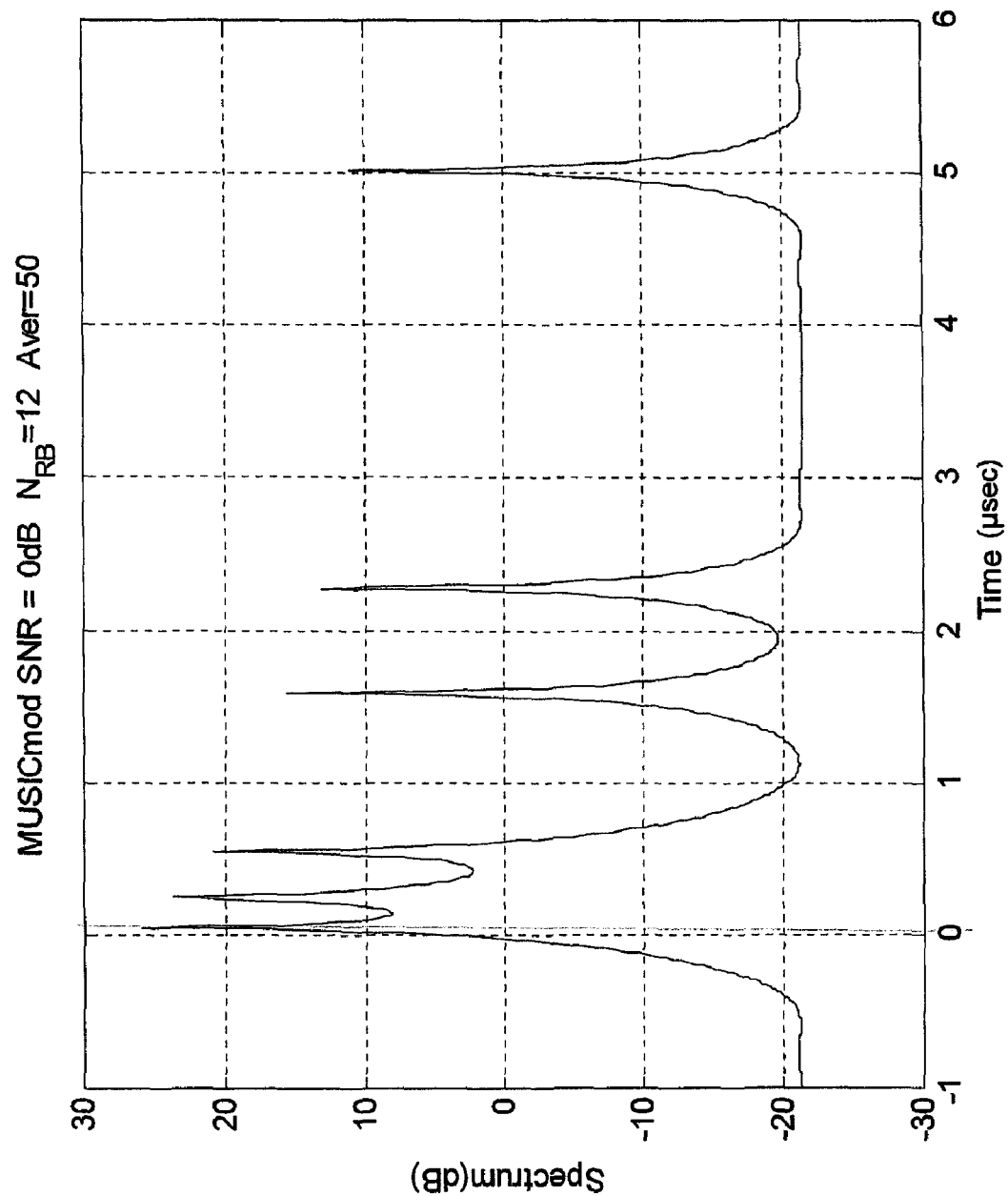
Figure 10A:
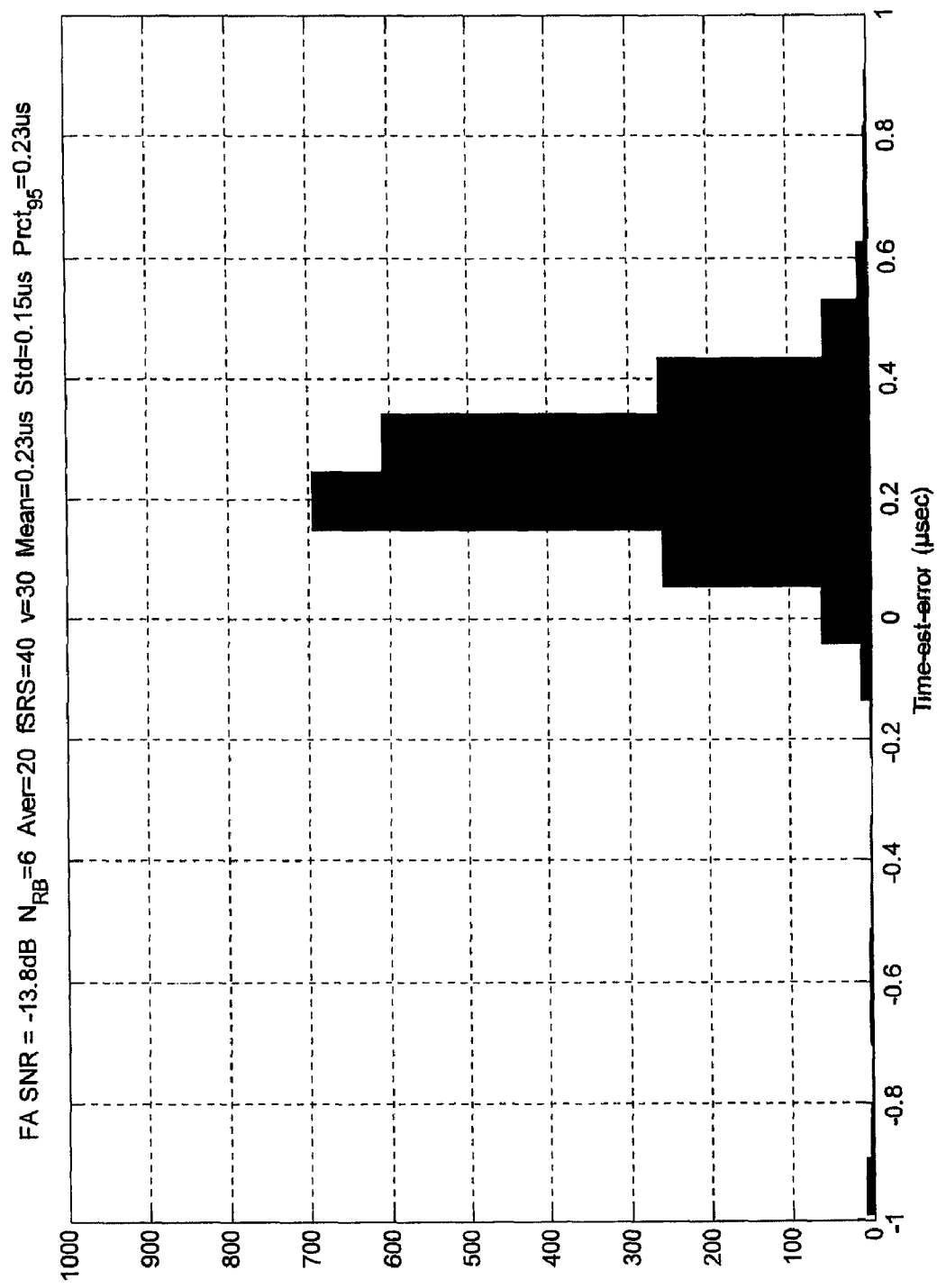
FIGS. 10A-D are time estimation errors for simulation Case 1.
Figure 10B:
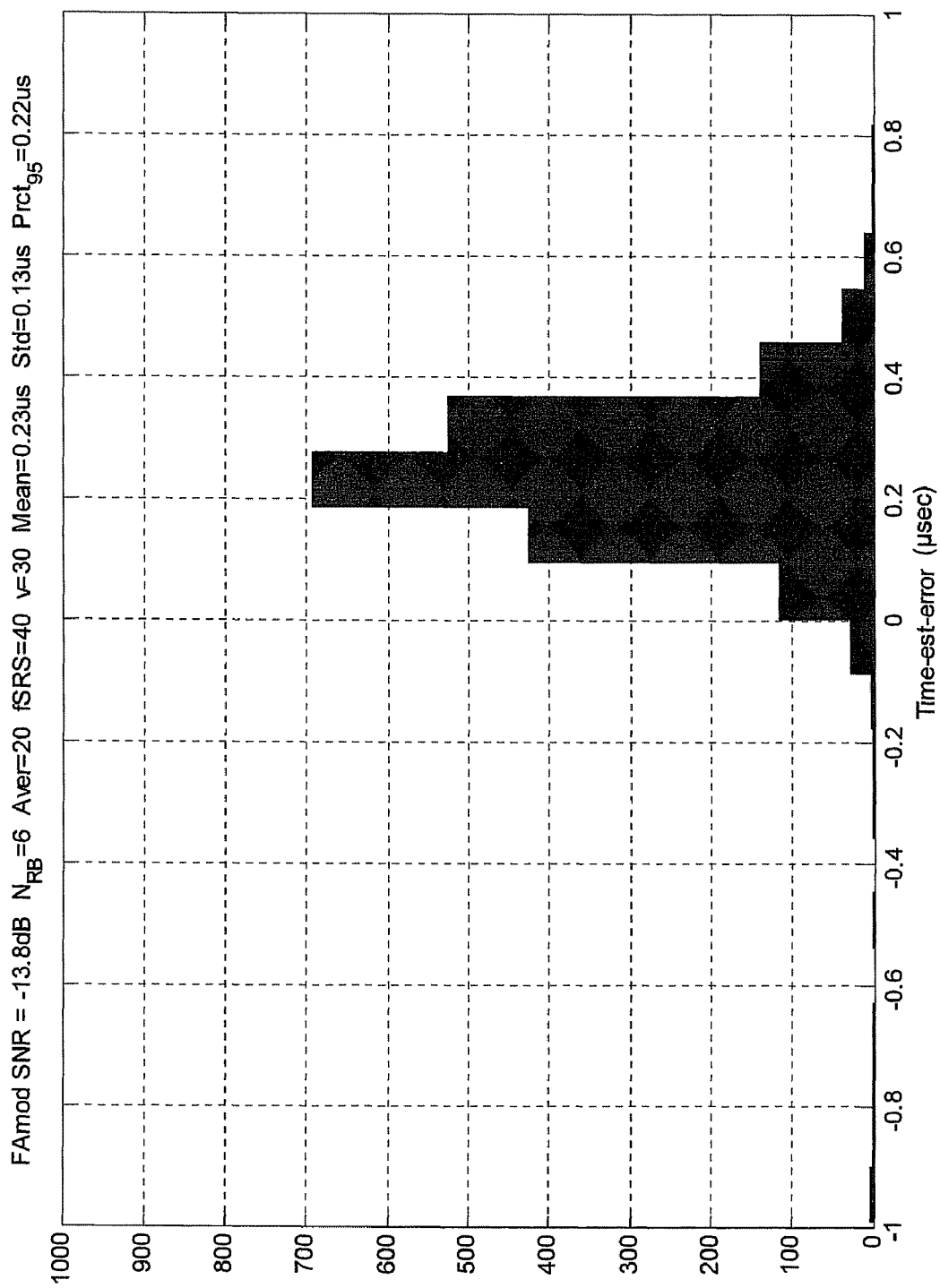
Figure 10C:
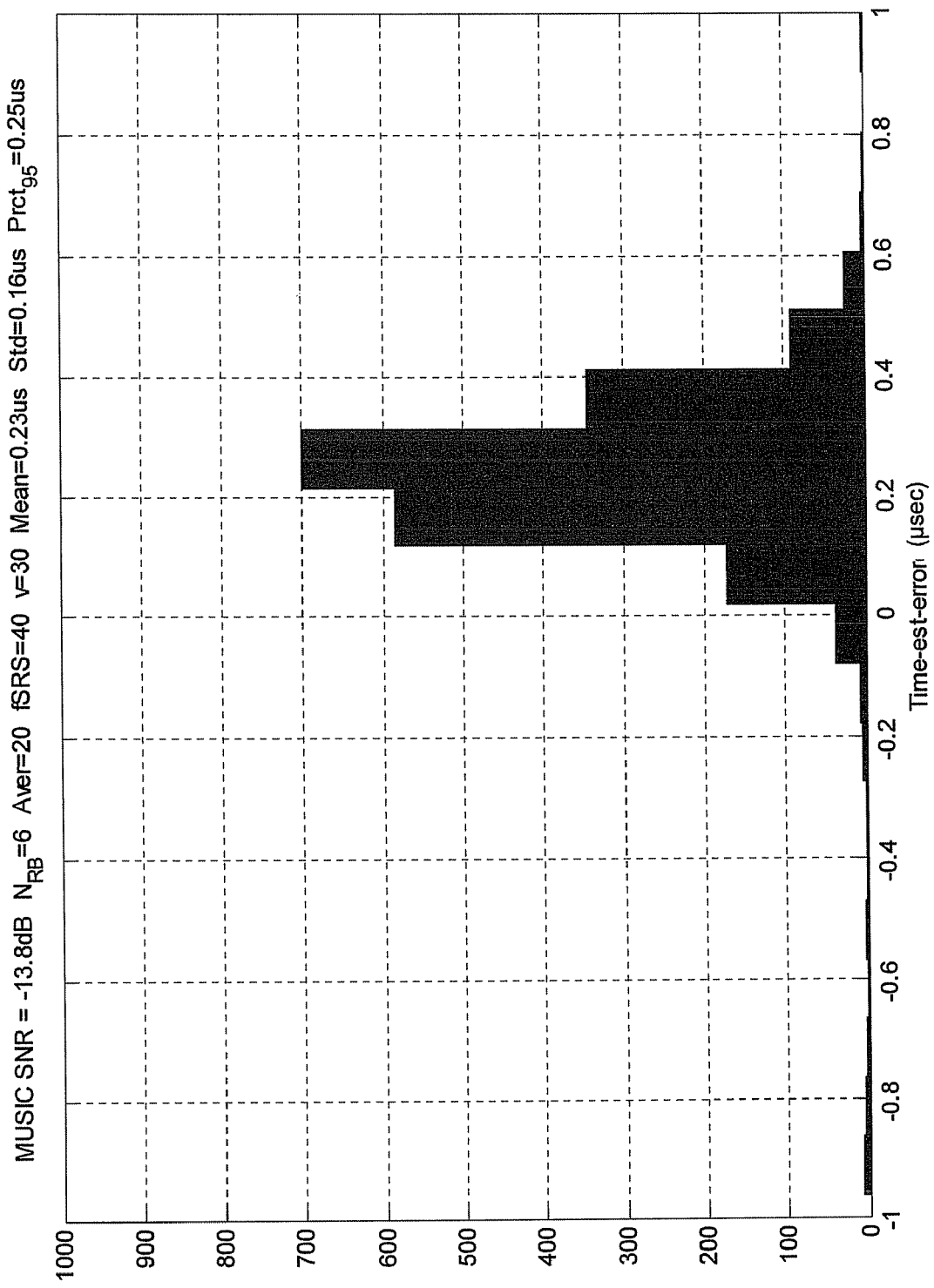
Figure 10D:
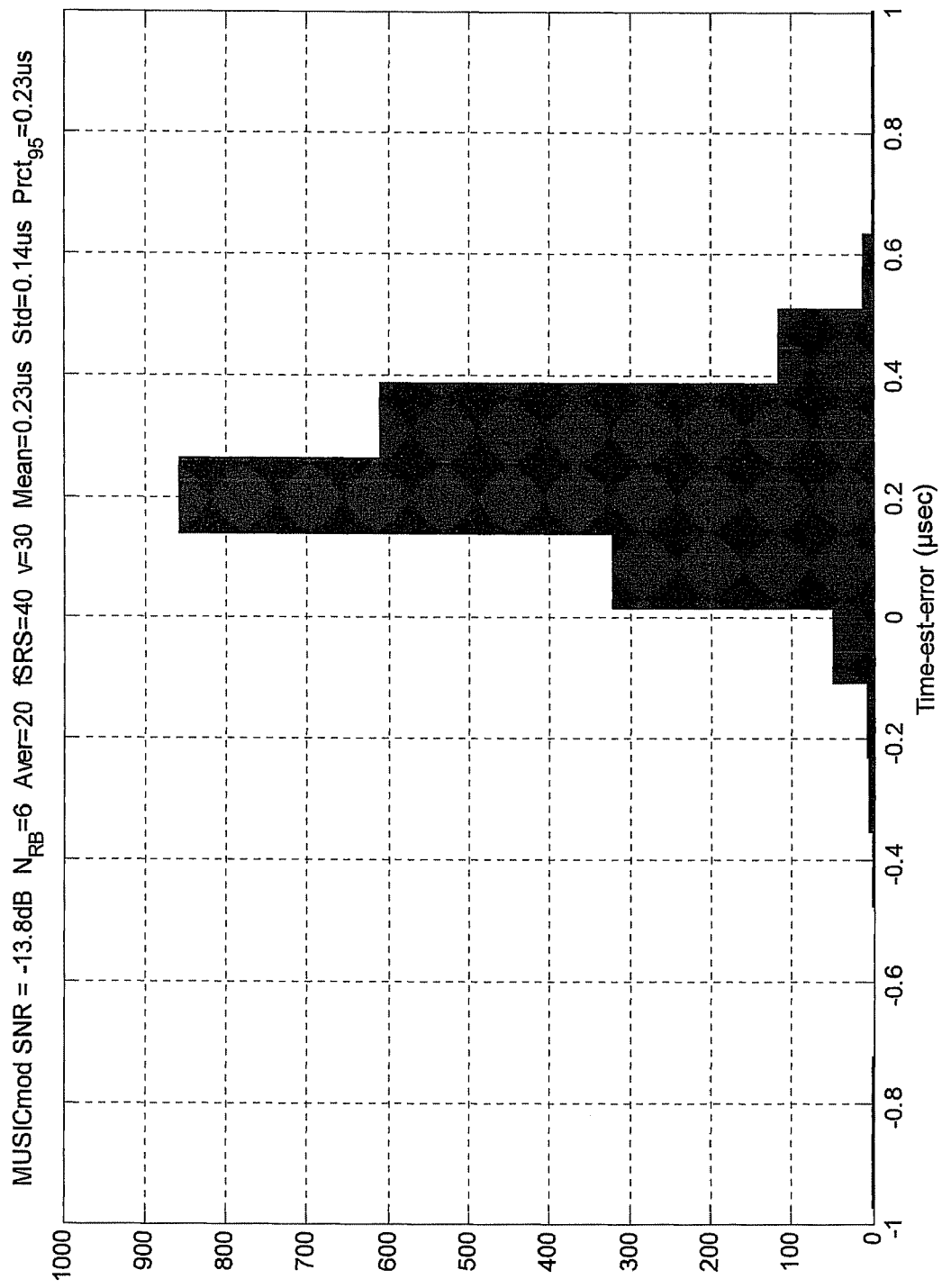
Figure 11A:
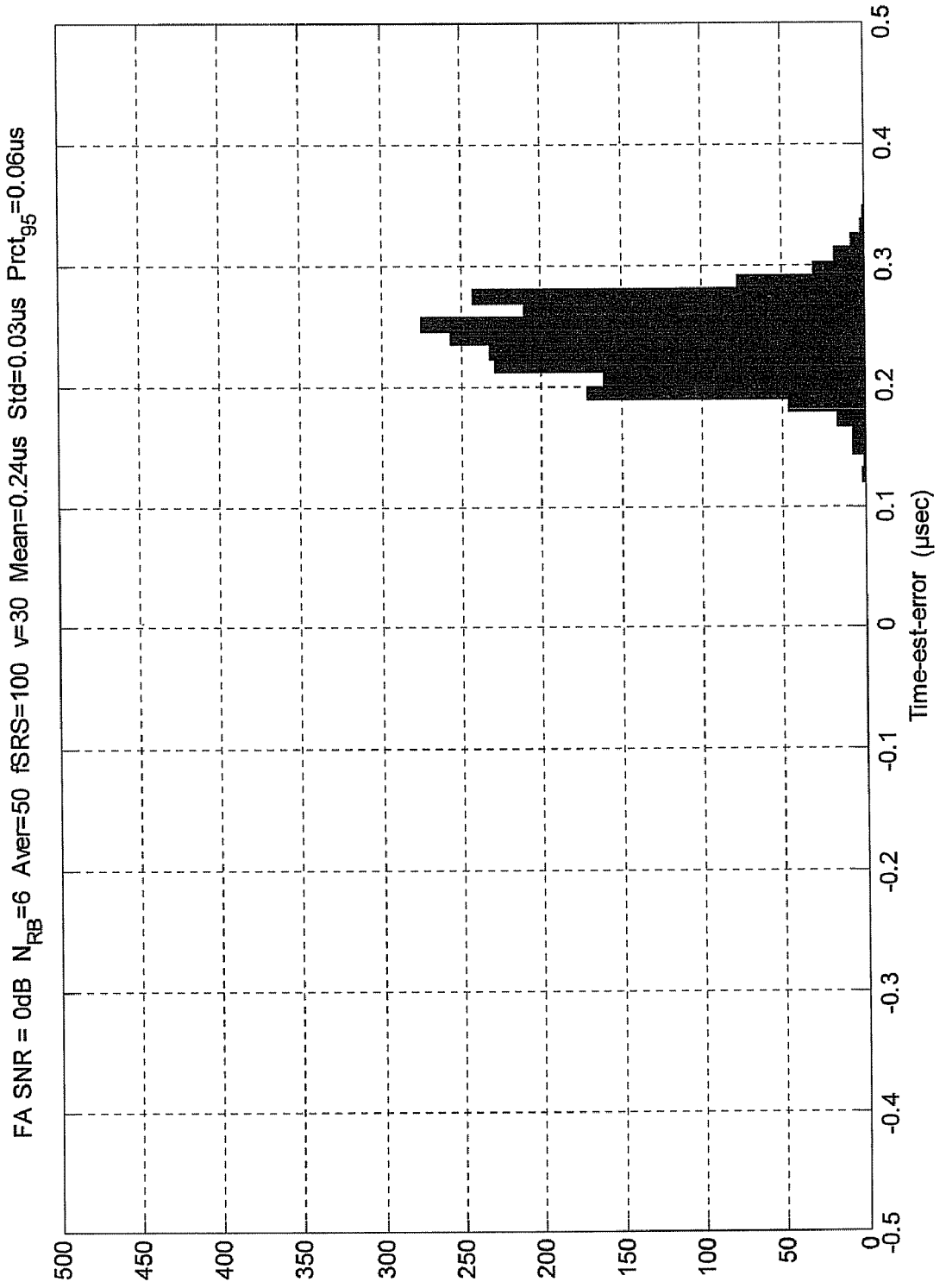
FIGS. 11A-D are time estimation errors for simulation Case 2.
Figure 11B:
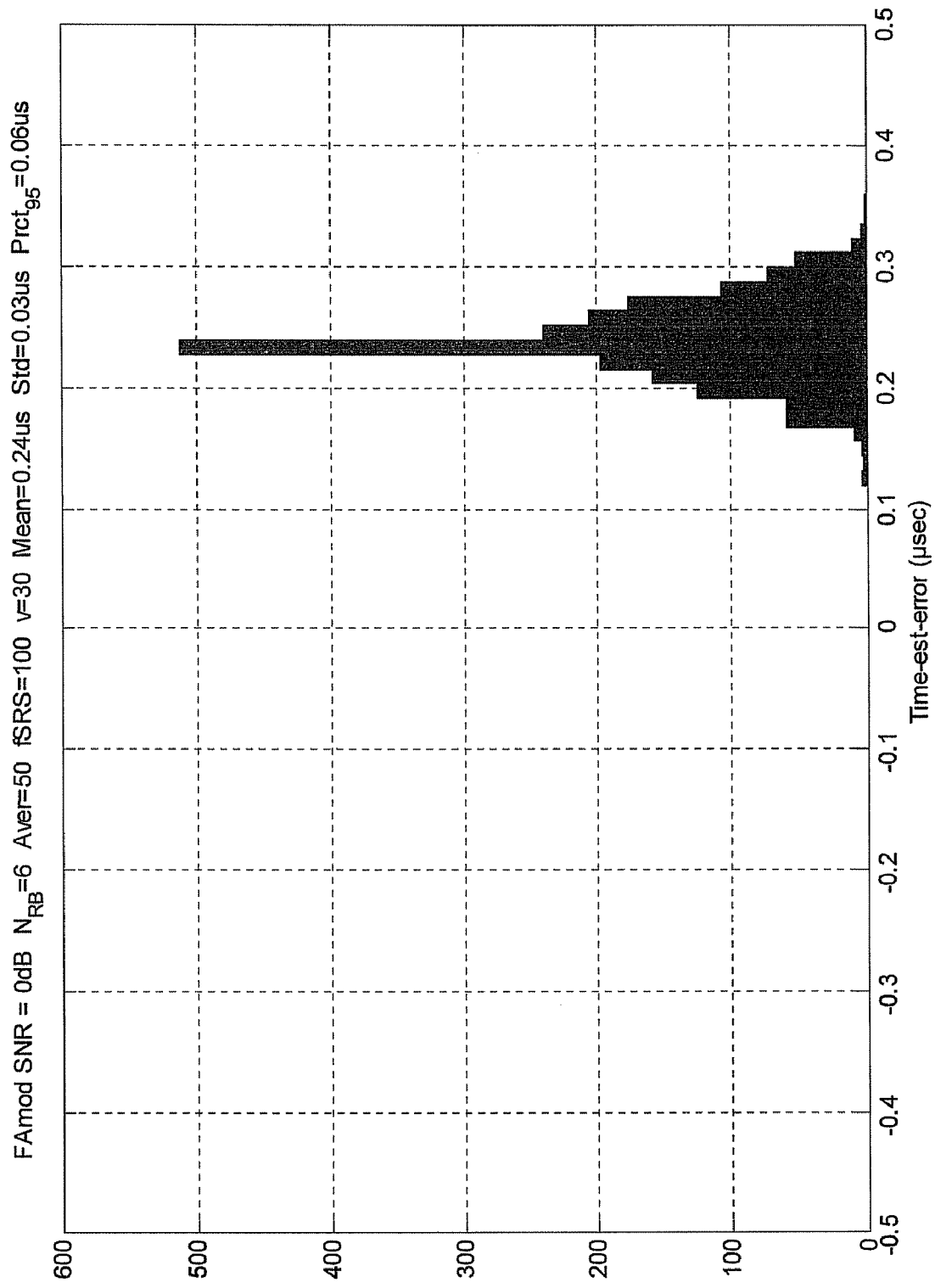
Figure 11C:
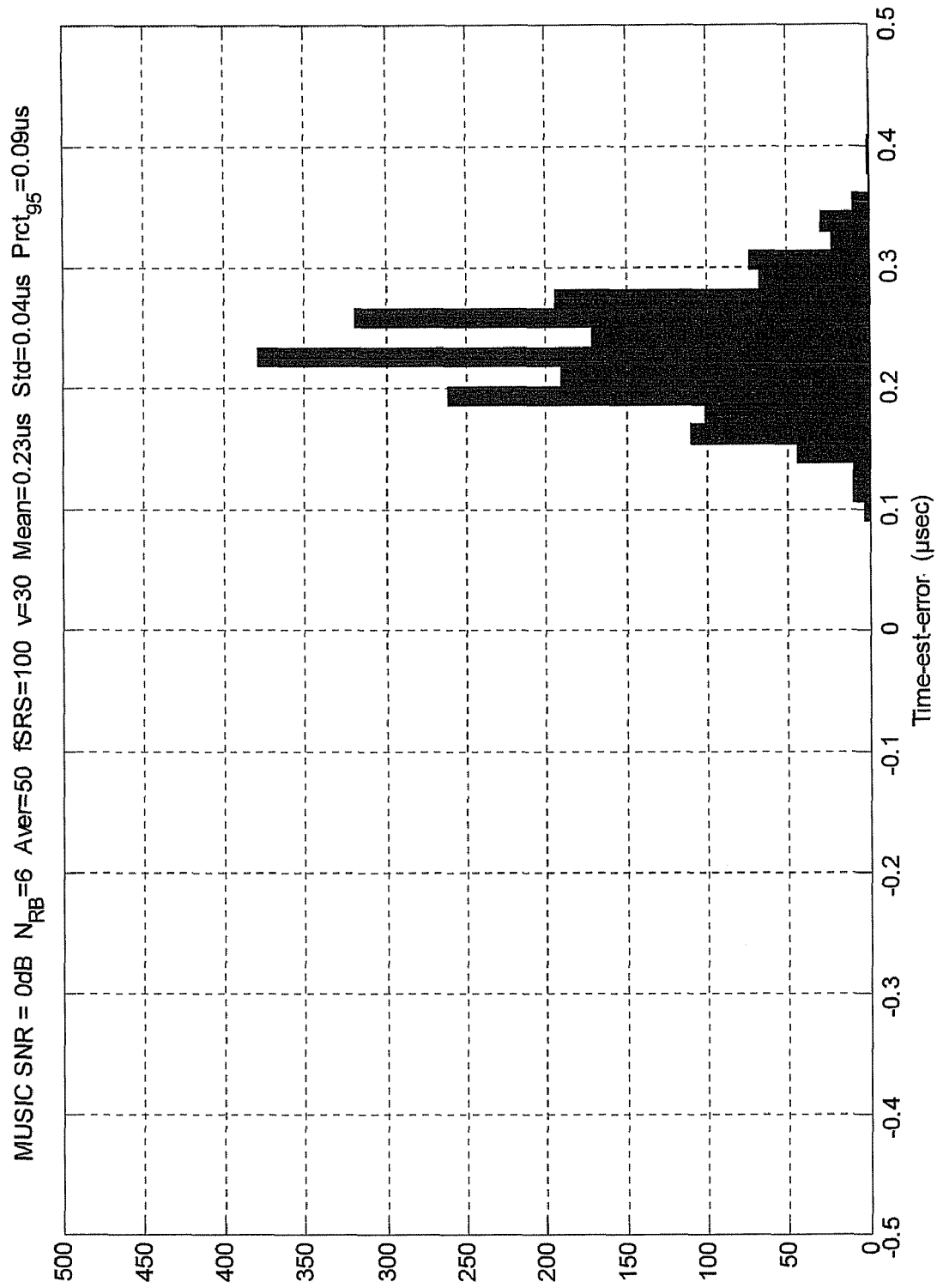
Figure 11D:
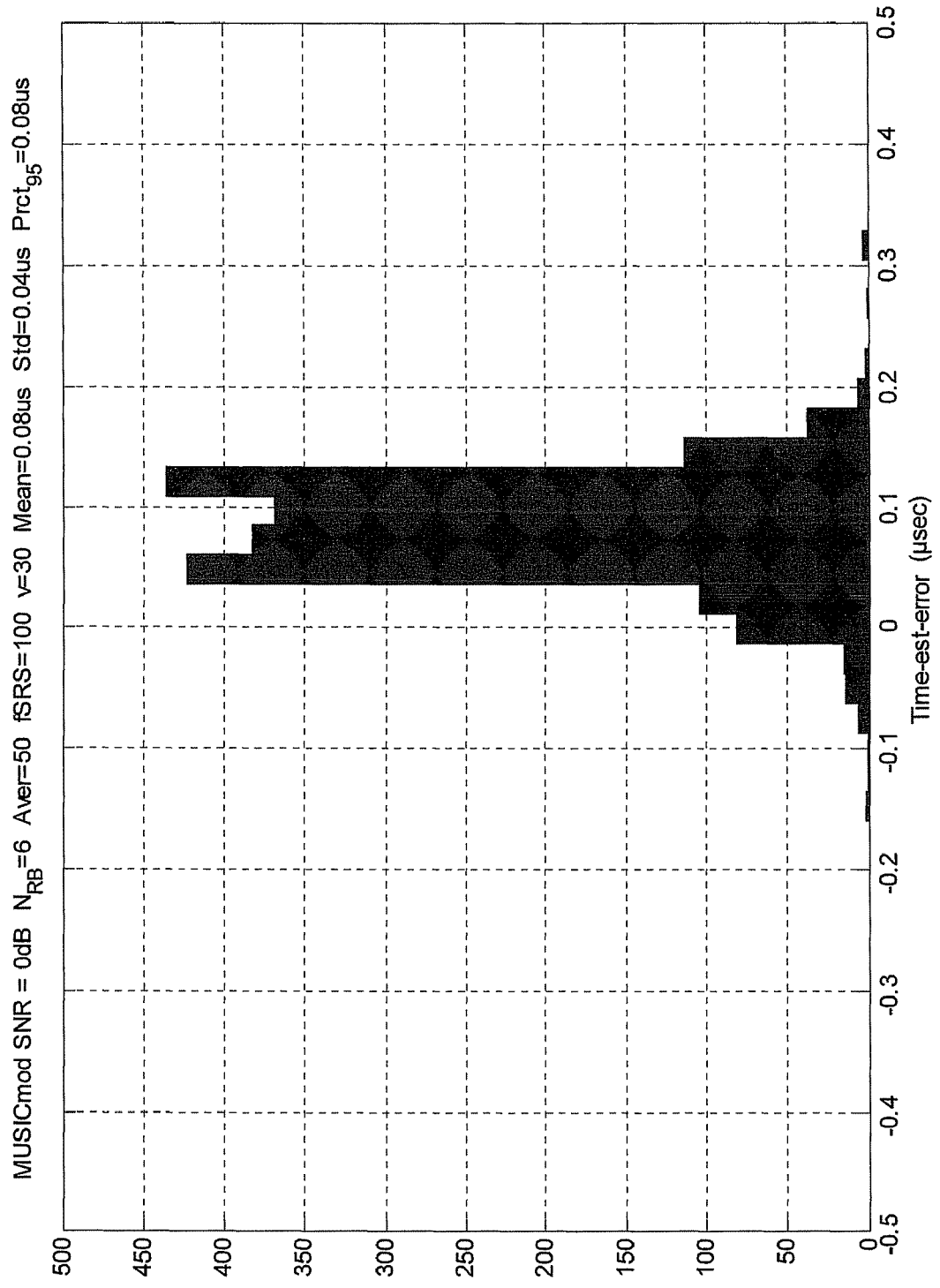
Figure 12A:
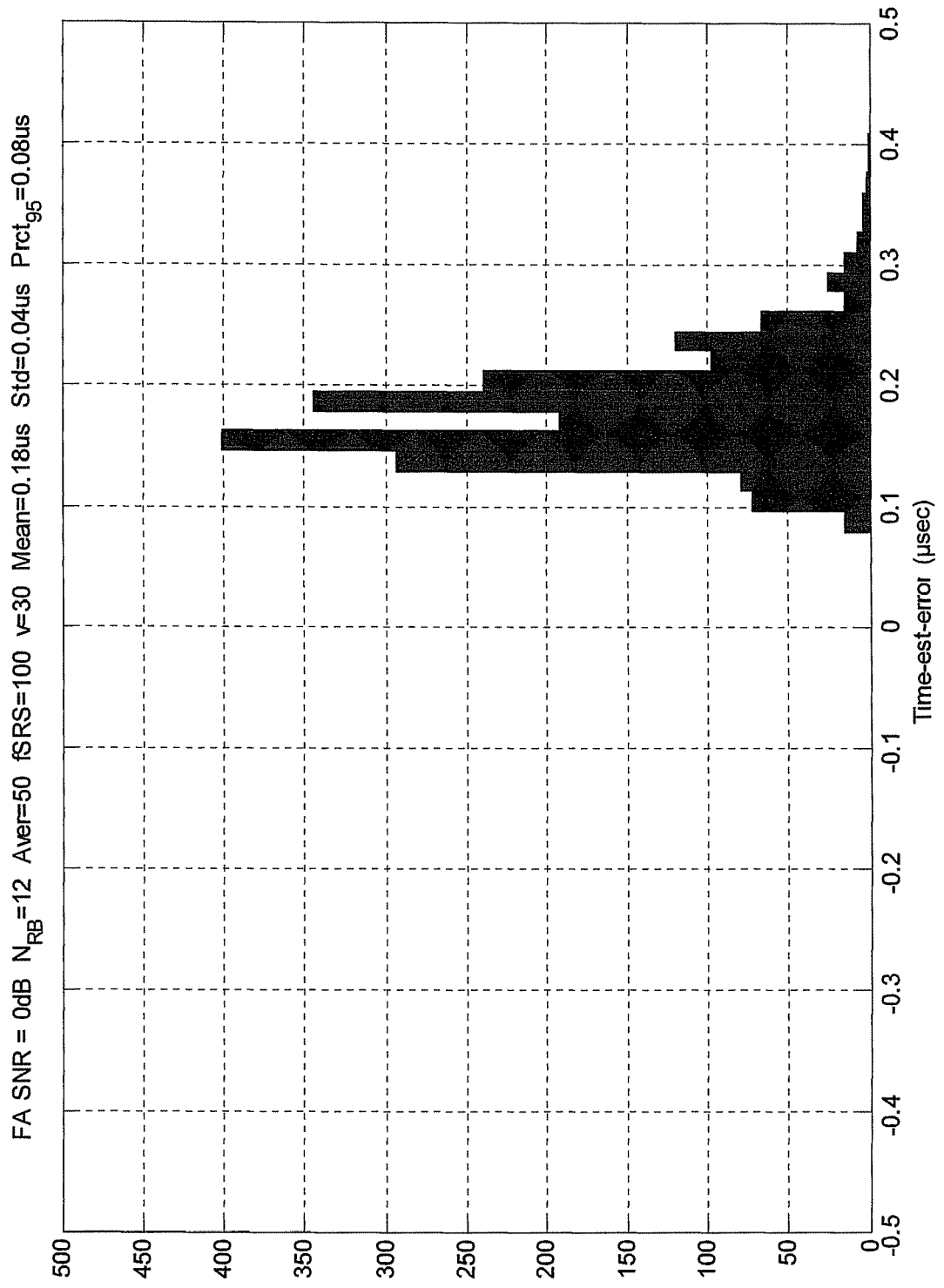
FIGS. 12 A-D are time estimation errors for simulation Case 3.
Figure 12B:
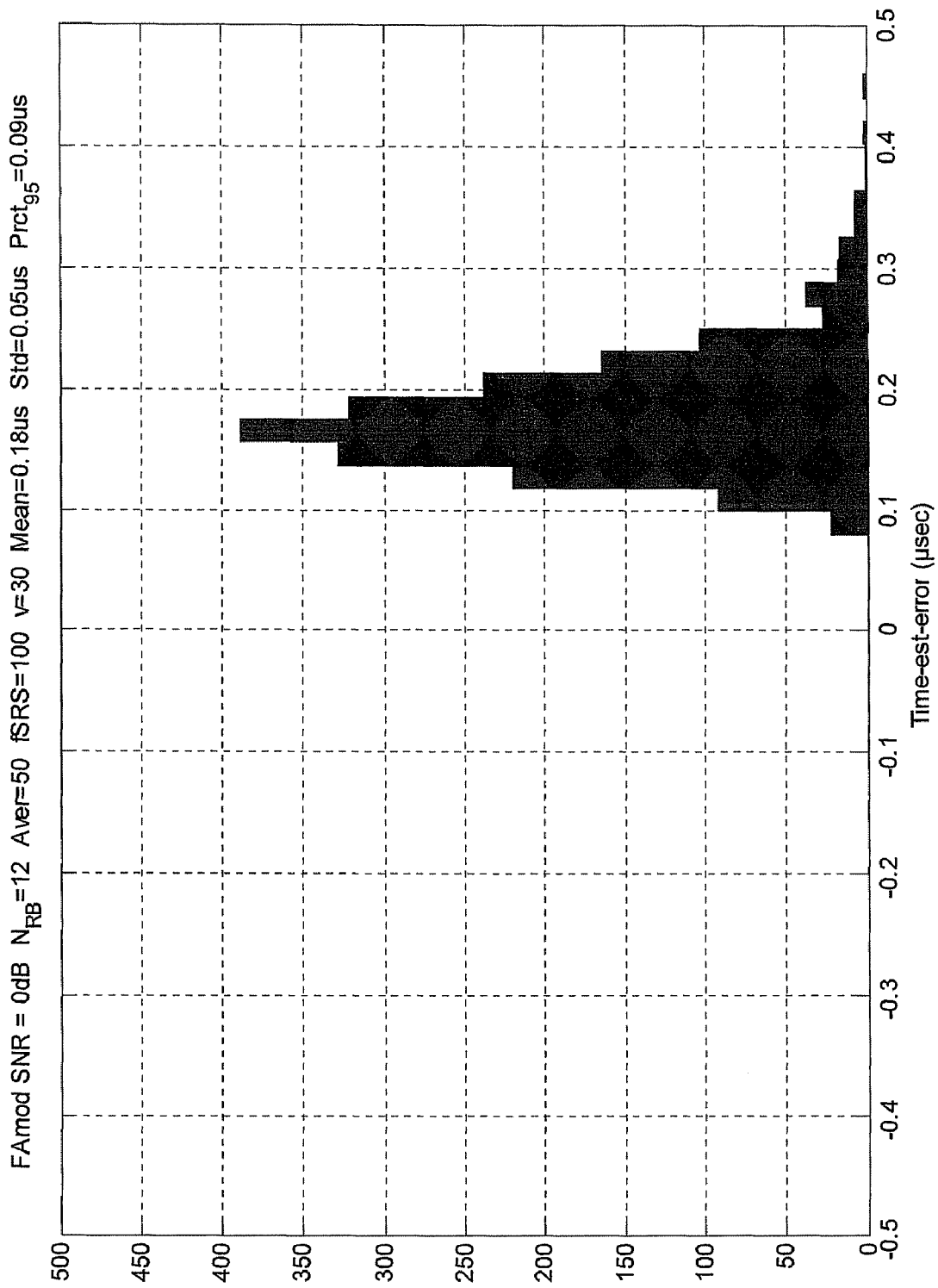
Figure 12C:
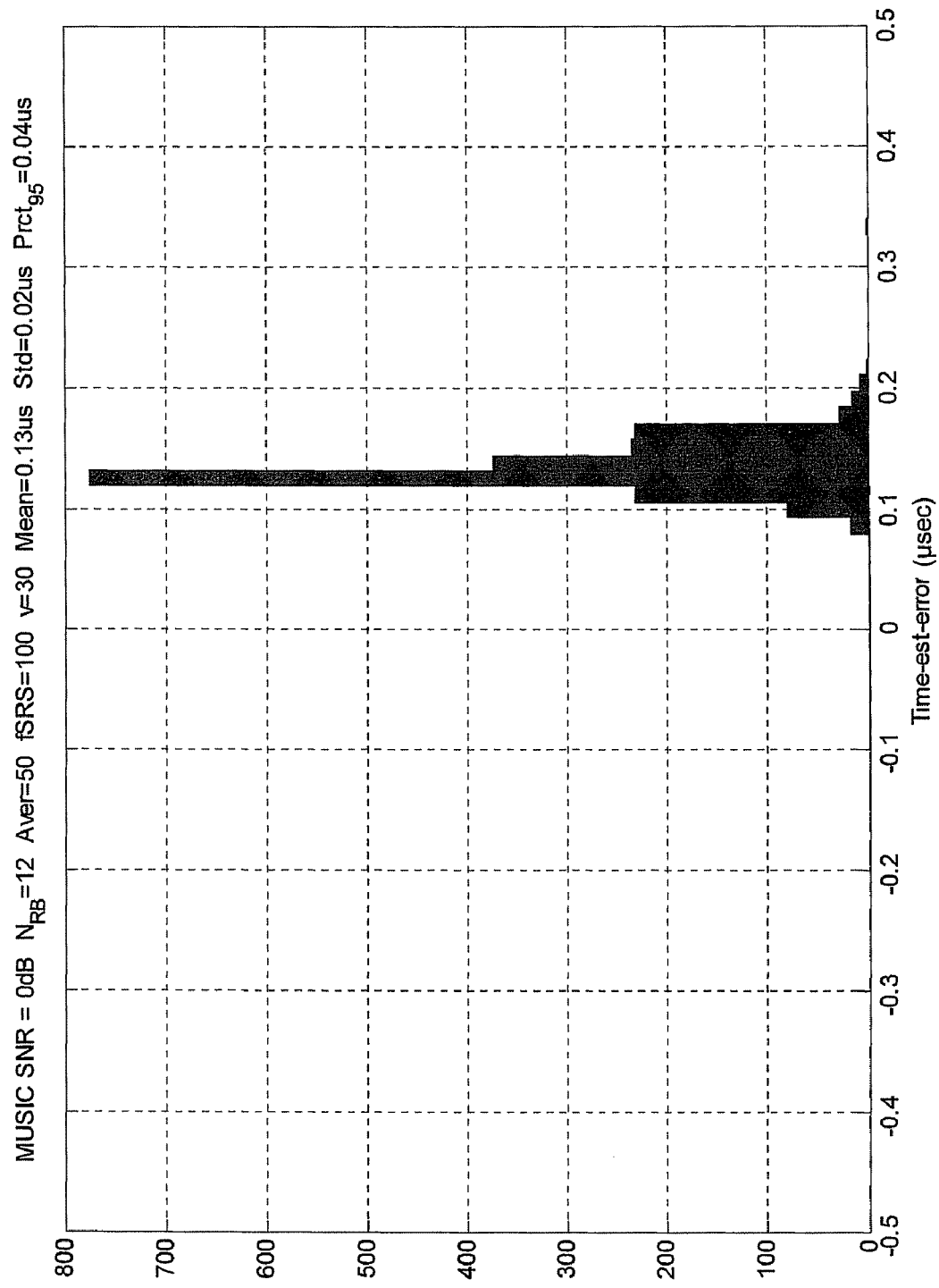
Figure 12D:
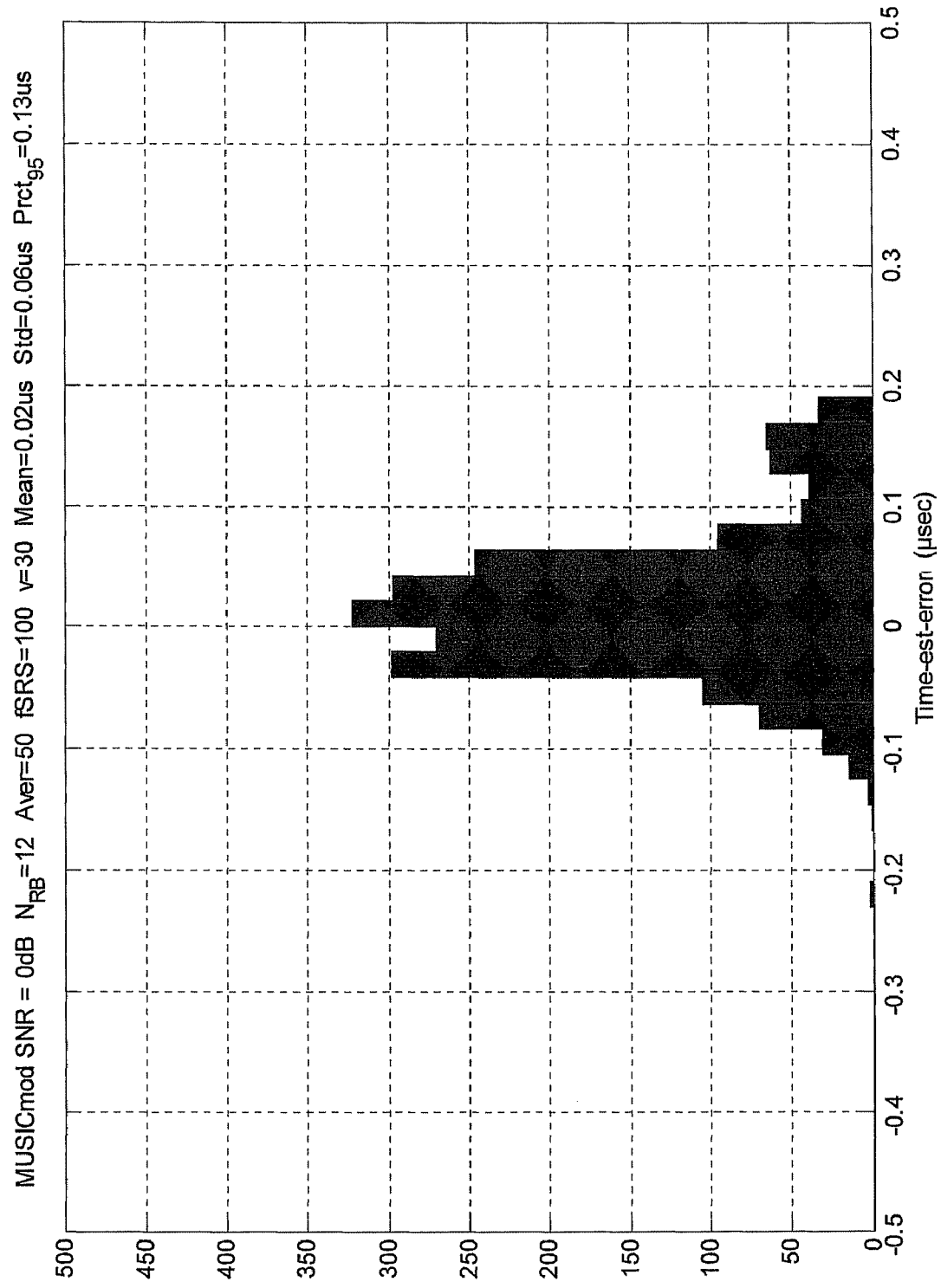

FIG. 6 presents a method of performing Long Term Evolution (LTE) Radio Link Timing Synchronization utilizing the techniques discussed above. At 602 a channel frequency response estimate $\bar{x}_k$ is obtained from a received UL signal. The channel frequency response covariance matrix $\bar{X}$ is then generated at 604. For MUSIC and ML algorithms a known number of multi-paths is required. There are some techniques that can be used to estimation the number of multi-paths, however it is assumed as a known parameter. When the averaged covariance matrix $\bar{X}$ is to be utilized, YES at 606, they are generated at 608, and Fourier Analyzing and MUSIC timing offset estimation algorithms are identified as modified Fourier Analyzing (FAmod) algorithm and modified MUSIC (MUSICmod) algorithm respectively. Otherwise, NO at 606, original covariance matrix will be used.

For one-dimensional metrics timing offset estimation algorithms, for example, FA algorithm and MUSIC algorithm, YES at 612, the position of the first peak offers a more meaningful time delay estimate. The first-peak searching can then be performed through 618 to 630. The metric m(t) is calculated according to FA or MUSIC algorithm in the defined searching window. The maximum and minimum value of the metric: $m_{max}$ and $m_{min}$ in the searching window is found at 620. The threshold as $m_{th} = m_{min} + \alpha \cdot (m_{max} - m_{min})$ is calculated at 622 where $\alpha$ takes value from 0 to 1. The metric is limited by $m(t) = \max(m(t), m_{th})$ to reduce the chance of finding false peak at 624. A search is performed for first ascending point where the metric goes up at 626. From the point found at 626, a search is performed for the first descending point where the metric goes down at 628. This is the position of the first peak. From the first peak a timing estimate can be determined at 630. The estimate of the first peak is then used to synchronize the device to the UL and processing of overhead information can then proceed. For multi-dimensional algorithms like ML algorithm, NO at 612, a multi-dimensional metric peak search is performed at 614 and a timing estimate is determined to enable synchronization to the UL.

Simulations are presented for the Fourier Analyzing (FA) algorithm and MUSIC algorithm in three cases for LTE UL timing synchronization in FIGS. 7 to 12.

Simulation Case 1 represents the cell edge situation in which low SNR, low SRS signal bandwidth and limited number of SRS OFDM symbols are available for timing estimation. The simulation parameters are set as: TU30 channel, (FIG. 5 illustrates the TU channel profile), 20 SRS symbols in rate of 40 Hz for one estimation; 6 resource blocks (RBs—each RB has 12 sub-carriers with 15 kHz spacing; all the sub-carriers are allocated continuously with each other); and −13.8 dB SNR.

Simulation Case 2 increases the SNR to 0 dB and the number of SRS OFDM symbols to 50 in rate of 100 Hz to simulation better radio link situation. Simulation Case 3 further increases SRS signal bandwidth to 12 RBs to examine the performance potential of the algorithms. These three cases are summarized in Table 2.

TABLE 2

Parameters used in the simulation cases.

| | Channel Model | SRS symbols/Rate (Hz) | Number of RBs | SNR (dB) |
|---|---|---|---|---|
| Case 1 | TU30 | 20/40 | 6 | −13.8 |
| Case 2 | TU30 | 50/100 | 6 | 0 |
| Case 3 | TU30 | 50/100 | 12 | 0 |

FIGS. 7A-D show an example timing estimation metrics of the proposed algorithms in simulation Case 1. With FIGS. 7A-D and the following figures, figures A to D correspond to FA, FAmod, MUSIC and MUSICmod timing offset estimation algorithms respectively. It can be seen from this figure that the all proposed algorithms cannot resolve the first three peaks (see FIG. 5 for the channel profile). While, the MUSIC and the modified MUSIC algorithms can show only one peak clearly.

FIGS. 8A-D shows, as an example, the algorithms' metrics in simulation Case 2. It can be seen from this figure that the modified MUSIC algorithm's resolution shows some improvement. It shows a total 5 peaks. The closely located first three peaks still can not be resolved. The FA and FAmod algorithms resolution don't have significant difference compared with that in case 1.

FIGS. 9A-D shows the algorithm metric examples in simulation Case 3. With increased signal bandwidth, all four algorithms' resolution gets improved. From this figure, it can be seen that the FA and FAmod algorithms can resolve the two peaks located around the 2 μsec positions, the MUSIC algorithm shows two peaks in the first 0.5 μsec period, which should be three peaks. The modified MUSIC (MUSICmod) algorithm clearly resolves all peaks.

FIGS. 10A-D to 12A-D show the algorithms' performance (histogram) in the three simulation cases. In simulation Case 1, value of parameter α in the First-Peak Searching algorithm is set to 0.4 for all FA, FAmod, MUSIC, MUSICmod metrics. In Case 2 and Case 3, value of α is set as 0.4 for FA and FAmod metrics, but 0.01 for MUSIC and MUSICmod metrics. The simulation results were taken from 2000 Monte-Carlo tests. The timing drift and Doppler frequency drift that cause by the wireless mobile device movement in one timing estimation have been taken into account in the simulation. The results of the algorithms' performance simulation are summarized in the following table.

TABLE 3

Simulation results summary

| | | FA (μsec) | FAmod (μsec) | MUSIC (μsec) | MUSICmod (μsec) |
|---|---|---|---|---|---|
| Case 1 | Mean | 0.23 | 0.23 | 0.23 | 0.23 |
| | Std | 0.15 | 0.13 | 0.16 | 0.14 |
| | 95th Percentile | 0.23 | 0.22 us | 0.25 | 0.23 |
| Case 2 | Mean | 0.24 | 0.24 | 0.23 | 0.08 |
| | Std | 0.03 | 0.03 | 0.04 | 0.04 |
| | 95th Percentile | 0.06 | 0.06 | 0.09 | 0.08 |
| Case 3 | Mean | 0.18 | 0.18 | 0.13 | 0.02 |
| | Std | 0.04 | 0.05 | 0.02 | 0.06 |
| | 95th Percentile | 0.08 | 0.09 | 0.04 | 0.13 |

From the simulation results, it can be seen that all these algorithms meet the 0.5 μsec $95^{th}$ percentile performance requirement for LTE UL timing synchronization even in worst case of the three simulation scenarios. In simulation Case 1 with low SNR, narrow bandwidth, and low number of SRS OFDM symbols, the FA, FAmod, MUSIC and MUSICmod algorithms have similar performance. In simulation Case 2, which has high SNR, more SRS OFDM symbols, but same bandwidth comparing with Case 1, the MUSICmod algorithm has significantly improved the performance of the mean error of the time estimate. However, the performance of the standard deviation (STD) and $95^{th}$ percentile of the timing estimation of MUSIC and MUSICmod algorithms have decreased slightly comparing to the FA and FAmod algorithms. In simulation Case 3, where the signal bandwidth is doubled comparing with in case 2, the MUSIC algorithm has slightly better mean error, STD and $95^{th}$ percentile performance than FA and FAmod algorithms. While, the MUSICmod algorithm has the greatest mean error performance, although has slightly worse STD and $95^{th}$ percentile performance, comparing with other algorithms. This very low mean error performance of the MUSICmod algorithm has benefited from the high resolution of the algorithm.

Though the proposed timing estimate algorithms are for LTE UL timing synchronization, they can be applied to DL link timing synchronization as well due to similar reference signal structure in both LTE uplink and downlink.

While a particular embodiment of the present method for Long Term Evolution (LTE) Radio Link timing synchronization has been described herein, it will be appreciated by those skilled in the art that changes and modifications may be made thereto without departing from the disclosure in its broadest aspects and as set forth in the following claims.

The invention claimed is:

1. A method for performing a radio link timing estimation for synchronization to a wireless communications channel, the method comprising:
   obtaining a channel frequency response estimate from a received reference signal comprising multiple non-coherent sounding reference signal (SRS) Orthogonal Frequency Division Multiplexing (OFDM) symbols;
   generating a frequency response covariance matrix from the channel frequency response estimate; and
   estimating timing offsets of the received reference signal using the frequency response covariance matrix and a timing offset estimation algorithm, the timing offset estimation algorithm comprising:
   calculating a one dimensional metric in a defined search window;
   limiting the one dimensional metric to a threshold value; and
   determining a timing estimate based upon a peak point of the metric.

2. The method of claim 1 wherein the wireless communications channel is based on a 3GPP Long Term Evolution Uplink (UL) channel.

3. The method of claim 2 wherein the timing offset estimation algorithm is performed using a Fourier Analyzing algorithm.

4. The method of claim 2 wherein the timing offset estimation algorithm is performed using a Multiple Signal Classification (MUSIC) algorithm.

5. The method of claim 1 wherein the timing offset estimation algorithm further comprises:
   determining a maximum value and a minimum value within the search window;
   determining the threshold value using the determined maximum value and the determined minimum value;
   limiting the one dimensional metric to the determined threshold value;
   searching for a first ascending point of the metric;
   searching for a first descending point of the metric; and
   determining the timing estimate based upon the peak identified by the first ascending point and the first descending point.

6. The method of claim 1 wherein estimating timing offsets further comprises:
   generating an averaged covariance matrix where the value of the matrix elements along each descending diagonal are replaced with their average value.

7. The method of claim 6 wherein the timing offset estimation algorithm further comprises:
   determining a maximum value and a minimum value within the search window;
   determining the threshold value using the determined maximum value and the determined minimum value;
   limiting the one dimensional metric to the determined threshold value;
   searching for a first ascending point of the metric;
   searching for a first descending point of the metric; and
   determining the timing estimate based upon the peak identified by the first ascending point and the first descending point.

8. A mobile wireless device operating on wireless network, the mobile wireless device comprising:
   a receiver; and
   a processor coupled to the receiver, the processor performing a radio link timing estimation for synchronization to a wireless communications channel comprising:
   obtaining a channel frequency response estimate from a received reference signal comprising multiple non-coherent sounding reference signal (SRS) Orthogonal Frequency Division Multiplexing (OFDM) symbols;
   generating a frequency response covariance matrix from the channel frequency response estimate; and
   estimating timing offsets of the received reference signal using the frequency response covariance matrix and a timing offset estimation algorithm comprising:
   calculating a one dimensional metric in a defined search window;

limiting the one dimensional metric to a threshold value; and determining a timing estimate based upon a peak point of the metric.

9. The mobile wireless device of claim 8 wherein the mobile wireless device is a 3GPP Long Term Evolution (LTE) compatible device.

10. The mobile wireless device of claim 9 wherein the timing offset estimation algorithm is performed using a Fourier Analyzing algorithm.

11. The mobile wireless device of claim 9 wherein the timing offset estimation algorithm is performed using a Multiple Signal Classification (MUSIC) algorithm.

12. The mobile wireless device of claim 8 wherein the timing offset estimation algorithm further comprises:

determining a maximum value and a minimum value within the search window;

determining the threshold value using the determine maximum value and the determined minimum value;

limiting the one dimensional metric to the determined threshold value;

searching for a first ascending point of the metric;

searching for a first descending point of the metric; and determining the timing estimate based upon the peak identified by the first ascending point and the first descending point.

13. The mobile wireless device of claim 8 wherein estimating timing offsets further comprises:

generating an averaged covariance matrix where the value of the matrix elements along each descending diagonal are replaced with their average value.

14. The mobile wireless device of claim 13 wherein the timing offset estimation algorithm further comprises:

determining a maximum value and a minimum value within the search window;

determining the threshold value using the determine maximum value and the determined minimum value;

limiting the one dimensional metric to the determined threshold value;

searching for a first ascending point of the metric;

searching for a first descending point of the metric; and determining the timing estimate based upon the peak identified by the first ascending point and the first descending point.

15. A base station transceiver in a wireless network, the base station transceiver comprising:

a receiver; and a processor coupled to the receiver, the processor performing a radio link timing estimation for synchronization to a wireless communications channel comprising:

obtaining a channel frequency response estimate from a received reference signal comprising multiple non-coherent sounding reference signal (SRS) Orthogonal Frequency Division Multiplexing (OFDM) symbols;

generating a frequency response covariance matrix from the channel frequency response estimate; and estimating timing offsets of the received reference signal using the frequency response covariance matrix and a timing offset estimation algorithm comprising:

calculating a one dimensional metric in a defined search window;

limiting the one dimensional metric to a threshold value; and determining a timing estimate based upon a peak point of the metric.

16. The base station transceiver of claim 15 wherein the wireless network is a 3GPP Long Term Evolution (LTE) network.

17. The base station transceiver of claim 15 wherein estimating timing offsets further comprises:

generating an averaged covariance matrix where the value of the matrix elements along each descending diagonal are replaced with their average value.

18. The base station transceiver of claim 15 wherein the timing offset estimation algorithm further comprises:

determining a maximum value and a minimum value within the search window;

determining the threshold value using the determined maximum value and the determined minimum value;

limiting the one dimensional metric to the determined threshold value;

searching for a first ascending point of the metric;

searching for a first descending point of the metric; and determining the timing estimate based upon the peak identified by the first ascending point and the first descending point.

* * * * *